United States Patent [19]
Nagahira

[11] Patent Number: 5,978,234
[45] Date of Patent: Nov. 2, 1999

[54] POWER SUPPLY DEVICE USING A RESONANCE BETWEEN A LEAKAGE COMPONENT AND A RESONANCE CAPACITOR TO REDUCE LOSS

[75] Inventor: Joji Nagahira, Yokohama, Japan

[73] Assignee: Canon Kabushiki Kaisha, Tokyo, Japan

[21] Appl. No.: 09/089,256

[22] Filed: Jun. 3, 1998

[30] Foreign Application Priority Data

Jun. 6, 1997 [JP] Japan ..................................... 9-165384
Jun. 6, 1997 [JP] Japan ..................................... 9-165385
Jun. 6, 1997 [JP] Japan ..................................... 9-165386
May 13, 1998 [JP] Japan ................................... 10-148395

[51] Int. Cl.$^6$ ................................................. H02M 3/335
[52] U.S. Cl. ............................................................. 363/19
[58] Field of Search .................................. 363/18, 19, 16, 363/97, 131

[56] References Cited

U.S. PATENT DOCUMENTS 4,958,268  9/1990  Nagagata et al. ........................... 363/19
5,392,206  2/1995  Peterson et al. ............................ 363/19

FOREIGN PATENT DOCUMENTS 5-130776  5/1993  Japan .

*Primary Examiner*—Shawn Riley
*Attorney, Agent, or Firm*—Fitzpatrick Cella Harper & Scinto

[57] ABSTRACT

In a power supply device in which a switching means for controlling power supply to the input winding of a transformer is connected to a resonance capacitor connected to the input winding of the transformer so as to obtain a predetermined DC voltage at an output capacitor connected to the output winding of the transformer in accordance with switching of the switching means, the device has a leakage transformer as the transformer, and a control means for controlling switching of the switching means, and the control means is controlled by the output voltage from the second output winding of the transformer, has a means for producing resonance between the resonance capacitor and a leakage inductance between the input winding and first output winding of the leakage transformer upon switching of the switching means, and delays the rise timing of the terminal voltage of the switching means using that means to reduce losses upon switching of the switching means.

19 Claims, 15 Drawing Sheets

FIG. 15A
PRIOR ART
DRAIN VOLTAGE Vds
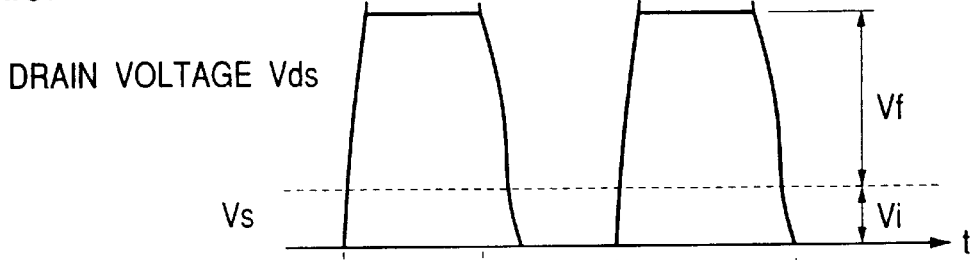
FIG. 15B
PRIOR ART
DRAIN ELECTRICAL CURRENT Id
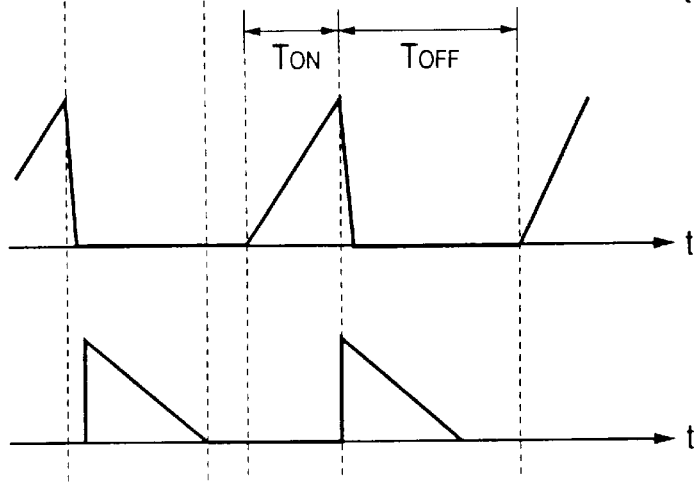
FIG. 15C
PRIOR ART
SECONDARY ELECTRICAL CURRENT I₂
FIG. 15D
PRIOR ART
DRAIN VOLTAGE Vds & DRAIN ELECTRICAL CURRENT Id
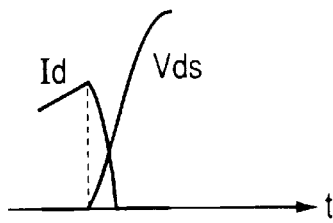

POWER SUPPLY DEVICE USING A RESONANCE BETWEEN A LEAKAGE COMPONENT AND A RESONANCE CAPACITOR TO REDUCE LOSS

BACKGROUND OF THE INVENTION

1. Field of the Invention

The present invention relates to a power supply device for a copying machine, LBP, BJ printer, and FAX and, more particularly, to a voltage resonance power supply device.

2. Related Background Art

A conventional voltage resonance power supply has been proposed by Japanese Laid-Open Patent Application No. 5-130776. FIG. 14 shows the circuit arrangement of this power supply, and FIGS. 15A to 15D show the operation waveform of a transistor 3 in FIG. 14 and the waveform of an electrical current supplied to a diode 8 on the secondary side.

In FIG. 14, the power supply device comprises an input power supply 1, a resonance capacitor 2, a transistor 3, a transformer 4 having primary and secondary windings 5 and 6, a gate drive winding 7 for the transistor 3, a diode 8, an output capacitor 9 for the transformer 4, an activation resistor 10, an ON width determination circuit 11, a feedback circuit 12, a gate-direction electrical current switching circuit 13, and a capacitor 17.

FIG. 15A shows the waveform of a drain voltage Vds of the transistor 3, FIG. 15B shows the waveform of a drain electrical current Id of the transistor 3, FIG. 15C shows the waveform of an electrical current 12 which flows in the rectification diode 8 on the secondary side, and FIG. 15D shows the drawn voltage Vds and drain electrical current Id of the transistor 3 upon switching the transistor 3 from ON to OFF, while being enlarged along the time axis.

The circuit shown in FIG. 14 corresponds to a self-excited switching flyback converter, and operates basically in the same way as a so-called RCC. More specifically, the activation resistor 10 temporarily turns on the transistor 3 to activate the circuit. When the transistor 3 is ON, an input voltage is applied to the primary winding 5 of the transformer 4, and a proportional voltage is induced in the drive winding 7. That voltage is input to the gate-direction electrical current switching circuit 13, the F terminal of which detects zero drain potential of the transistor 3. Then, the circuit 13 is turned on from its H terminal to G terminal to maintain the transistor 3 ON via the capacitor 17. At this time, the drain electrical current Id linearly increases, as shown in FIG. 15B.

The feedback circuit 12 sends a signal to the ON width determination circuit 11 in accordance with the output voltage. The circuit 11 determines the ON width and turns off the transistor 3. When the transistor 3 is turned off, the drain voltage of the transistor 3 immediately rises due to energy built up on the capacitor owing to the voltage resonance effect of the resonance capacitor 2 and primary winding 5, and magnetic energy supplied by the primary winding, and the diode 8 on the secondary side is enabled eventually, thus maintaining the drain voltage below a predetermined value. As the secondary electrical current, a triangular wave electrical current flows, as shown in FIG. 15C, and excitation energy is radiated toward the secondary side. After the energy radiation, the drain voltage starts a resonance damped oscillation by the energy built up on the capacitor, and falls relatively slowly. The drain voltage becomes zero eventually. When the drain voltage has become zero, the gate direction electrical current switching circuit 13 repeats the above-mentioned operations.

However, in the above prior art, when the drain voltage of the transistor 3 becomes zero by its resonance damped oscillation, the transistor 3 is turned on to enable zero voltage switching, thereby reducing switching losses. However, as shown in FIG. 15D, when the transistor 3 is turned off, the drain voltage changes abruptly, resulting in an increase in switching losses due to superposition of the drain voltage and electrical current, and in increased noise. As shown in FIG. 15C, a triangular wave electrical current flows in the rectification diode on the secondary side, and switching losses and noise are produced in the rectification diode due to abrupt changes in electrical current.

SUMMARY OF THE INVENTION

It is an object of the present invention to provide a power supply device which can remove the above-mentioned drawbacks, and can reduce losses in a transistor and rectification diode on the secondary side upon switching.

It is another object of the present invention to provide a voltage resonance power supply which requires neither a voltage detection circuit for switching means nor gate-direction electrical current switching circuit.

Other objects of the present invention will become apparent from the following detailed description of the embodiments.

BRIEF DESCRIPTION OF THE DRAWINGS

FIGS. 15A, 15B, 15C, and 15D are waveform charts of switching means of the conventional power supply device shown in FIG. 14.

DESCRIPTION OF THE PREFERRED EMBODIMENTS

The preferred embodiments of the present invention will be described hereinafter with reference to the accompanying drawings. The first embodiment of the present invention will be explained first.

Figure 1:
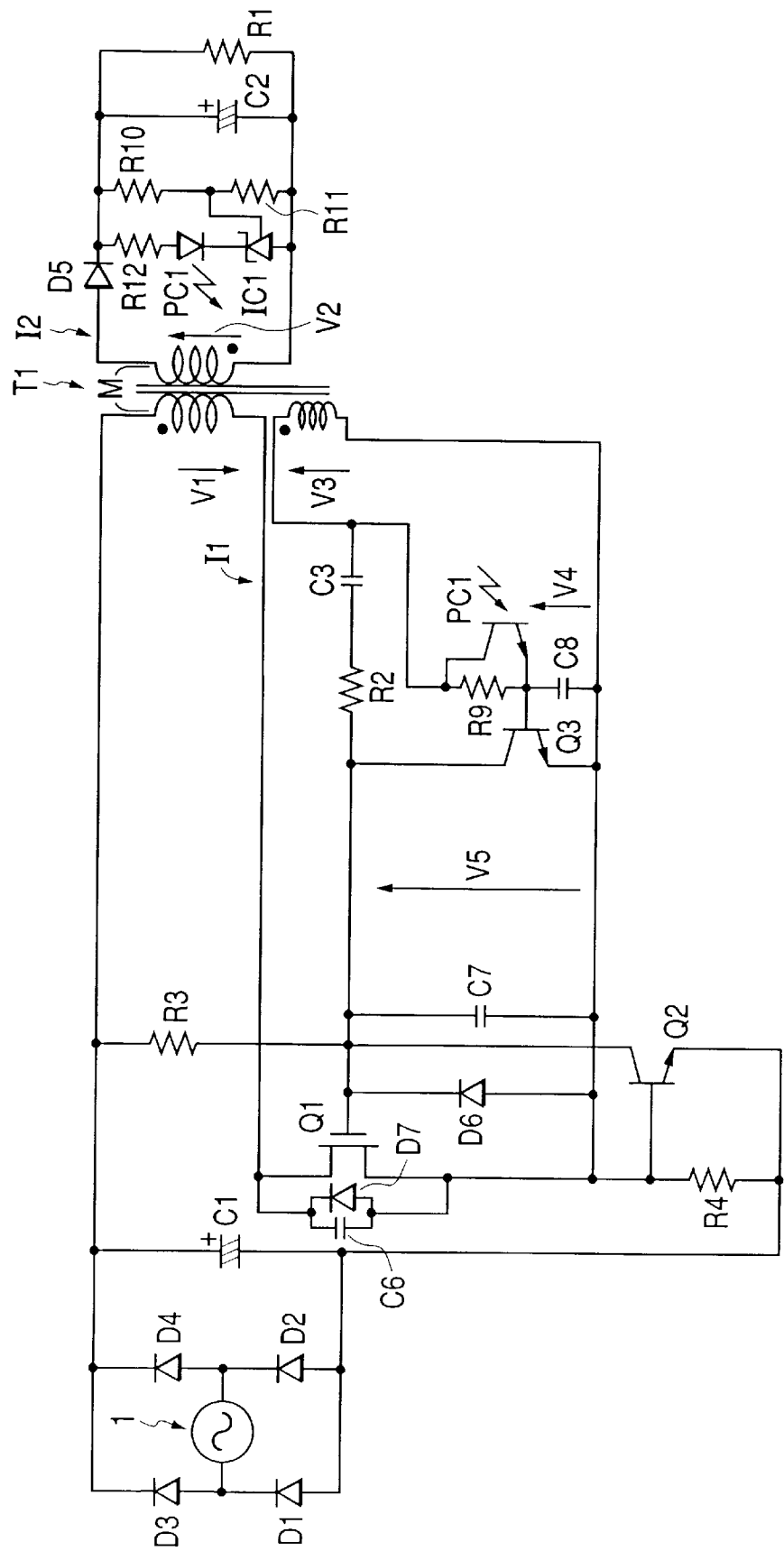
FIG. 1 is a circuit diagram of a power supply device according to the first embodiment of the present invention.
Figure 2:
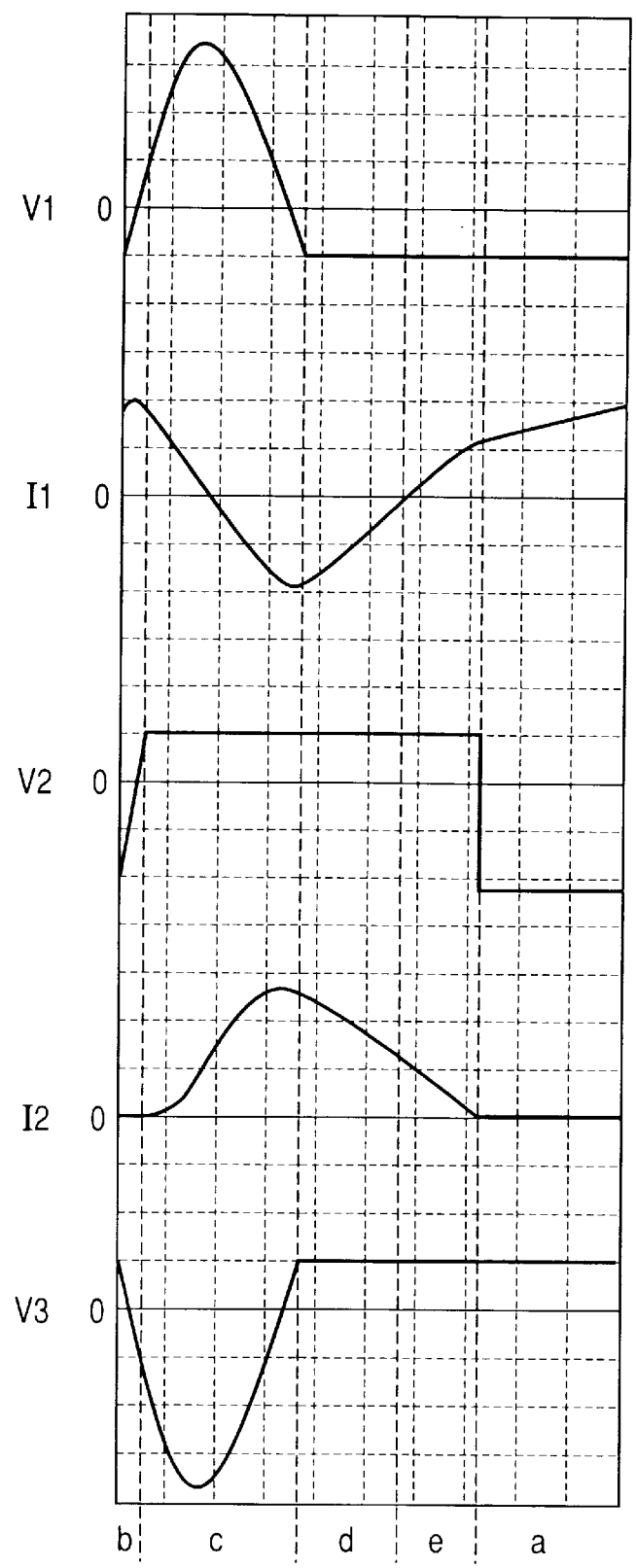
FIG. 2 is a waveform chart of principal part of the power supply device shown in FIG. 1.

FIG. 1 is a circuit diagram of a power supply device according to the first embodiment of the present invention, and FIG. 2 shows the waveforms of respective units. In FIG. 1, the power supply device comprises a commercial power supply 1, a leakage transformer T1, a switching element Q1 comprising, e.g., a FET, transistors Q2 and Q3, diodes D1, D2, D3, D4, D5, D6, and D7, a shunt regulator IC1, a photocoupler PC1, electrolytic capacitors C1 and C2, capacitors C3, C6, C7, and C8, and resistors R1, R2, R3, R4, R9, R10, R11, and R12.

Let I1 and I2 be the electrical currents that flow in the windings of the transformer T1 in correspondence with voltages V1 and V2, L1 and L2 be the self-inductances of the windings, M be the mutual inductance of the two windings, and N be the turn ratio. Also, the coupling coefficient is given by $K=M/\sqrt{(L1 \cdot L2)}$.

The operation of the above-mentioned power supply circuit will be explained below. The power supply circuit is designed as a self-excited oscillation circuit, and repeats a series of states. Hence, an explanation will be given along with states a to e shown in FIG. 2, starting from state a, in which the switching operation is activated. An AC voltage of the commercial power supply 1 is rectified by the diodes D1, D2, D3, and D4, and is smoothed by the electrolytic capacitor C1, thus obtaining a DC voltage across the two terminals of the capacitor C1. When the DC voltage has been produced across the two terminals of the electrolytic capacitor C1, an electrical current flows in the resistor R3, and as a result, the switching element Q1 is turned on. Then, the primary side of the transformer T1 is driven, and outputs are produced in the two windings of the transformer T1, thus activating first switching operation.

Assuming that the voltage across the two terminals of the electrolytic capacitor C1 is Vin (positive) when the switching element Q1 is ON and the diode D5 is OFF, the voltage V1 becomes about −Vin, and the output voltage V2 becomes approximately −K/N·Vin. Hence, the electrical current I1 increases at a rate of about Vin/L1 per unit time. The electrical current I2 is zero.

A voltage V3 is positive, and turns on the switching element Q1 via the capacitor C3 and resistor R2. However, when the voltage V3 (positive) charges the capacitor C8 via the resistor R9, and a voltage V4 has reached Vbe (base potential) of the transistor Q3, the transistor Q3 is turned on to turn off the switching element Q1. The above-mentioned state is state a in FIG. 2.

When the switching element Q1 is OFF, the voltage V1 rises since the capacitance the capacitor C6 resonates with the inductance L1. Also, the voltage V2 rises in the same resonance state as the voltage V1, and the diode D5 is turned on eventually. The electrical current I1 flows as a resonance electrical current, and the current I2 is maintained zero. The above-mentioned state is state b in FIG. 2.

When the diode D5 is ON, the voltage V2 becomes nearly equal to a voltage Vo across the two terminals of the capacitor C2. The voltage V1 rises and falls eventually since the capacitance of the capacitor C6 resonates with a leakage inductance component $L1 \cdot (1-K^2)$, and becomes a voltage −Vin, thus enabling the diode D7. Both the electrical currents I1 and I2 flow as resonance electrical currents. The above-mentioned state is state c in FIG. 2.

When the rectification diode on the secondary side is OFF, the inductance seen from the primary side is the self-inductance L1; when the rectification diode on the secondary side is OFF, the inductance seen from the primary side is the leakage inductance component $L1(1-K^2)$. For example, when a loosely coupled transformer having a coupling coefficient K=0.84 is used, this results in the use of a transformer having a relatively large leakage inductance component of about 0.3 L1. As a consequence, the voltage V1 in FIG. 2 has a voltage waveform that rises and falls slowly.

When the diode D7 is enabled and the voltage V1 has reached a voltage −Vin, the voltage V2 becomes roughly equal to the voltage Vo. The electrical current I1 increases at a rate of about $(Vin+K \cdot N \cdot Vo)/(L1 \cdot (1-K^2))$ per unit time, and the electrical current value becomes positive eventually, thus turning off the diode D7. On the other hand, the electrical current I2 decreases at a rate of about $N \cdot (K \cdot Vin+N \cdot Vo)/(L1 \cdot (1-K^2))$ per unit time. The above-mentioned state is state d in FIG. 2.

When the diode D7 is OFF and the switching element Q1 is ON, the voltage V1 is −Vin, and the voltage V2 becomes roughly equal to the voltage Vo. The electrical current I1 increases at a rate of about $(Vin+K \cdot N \cdot Vo)/(L1 \cdot (1-K^2))$ per unit time. On the other hand, the electrical current I2 decreases at a rate of about $(K \cdot Vin+N \cdot Vo)/(L1 \cdot (1-K^2))$ per unit time. The above-mentioned state is state e in FIG. 2.

The state of the switching element Q1 from state a to state e will be described below. In state a, the switching element Q1 is ON, as described above. The transistor Q3 is turned on to turn off the switching element Q1, shifting to state b.

In states b and c, the voltage V3 drops to a value that can maintain the switching element Q1 OFF. After that, the voltage V3 drops below a voltage equal to or lower than Vbe of the transistor Q3 to discharge the capacitor C8 via the resistor R9. As a result, the voltage V3 turns off the transistor Q3 and maintains the switching element Q1 OFF.

Subsequently, the voltage V3 rises due to resonance, and charges the capacitor C7 via the capacitor C3 and resistor R2. However, by selecting an appropriate capacitance for the capacitor C7, the switching element Q1 is maintained OFF.

In state d, the capacitor C7 is selected to have an appropriate capacitance, so that the voltage of the capacitor C3 further rises to switch the switching element Q1 to ON (note that the capacitance of the capacitor C7 is also selected to have a value that maintains the switching element Q1 OFF in states b and c, as described above).

Putting it in other words, i.e., when the function of the capacitor C7 is examined in terms of the relationship between the voltages V3 and V5 (for example, the gate-source voltage when the switching element Q1 comprises a FET as in the illustrated embodiment), the capacitor C7 forms a phase delay circuit together with the resistor R2. Hence, the phase of the voltage V5 (its waveform is not shown) is delayed from that of the voltage V3. As a result, the voltage V3 becomes zero in state c (resonance state), while the voltage V5 becomes zero in state d (non-resonance state) (of course, the capacitance of the capacitor C7 is selected in advance to set the voltage V5 zero in the non-resonance state). More specifically, when the reverse bias applied across the gate and source of the switching element Q1 comprising the FET disappears, and the voltage V5 as the ON condition for the FET has become zero, the switching element Q1 is turned on. In state e, the switching element Q1 is maintained ON.

As described above, by repeating from states a to e, energy is saved in the transformer T1 in the ON state of the switching element Q1, and is radiated therefrom in the OFF state of the switching element Q1, thus obtaining the output at the secondary side. The switching element Q1 is turned on in state d and turned off upon switching from state a to state b, i.e., the switching element Q1 is switched at the time of a voltage=0 V (it is switched from OFF to ON in the non-resonance state), thus providing a voltage resonance power supply free from any switching losses. In state b, appropriate resonance between the capacitance of the capacitor C6 and leakage inductance component $L1 \cdot (1-K^2)$ can be obtained using a loosely coupled transformer. Also, in state c, appropriate resonance between the capacitance of the capacitor C6 and leakage inductance component $L1 \cdot (1-K^2)$ can be obtained using a loosely coupled transformer.

The method of controlling the output voltage Vo across the two terminals of the load R1 to be constant will be explained below. As an arrangement for voltage control, the circuit comprises a voltage divider formed by the resistors R10 and R11, the shunt regulator IC1 for detecting a voltage divided by the voltage divider, and generating the voltage according to the detected voltage, the photocoupler PC1 for changing the amount of light to be emitted by its light-emitting element according to the voltage generated by the shunt regulator IC1, thereby changing the amount of light to be received by its light-receiving element, and a means (transistor Q3, capacitor C8, and the like) for controlling the ON-to-OFF switching timing of the switching element Q1 in accordance with the electrical current value changed by the photocoupler PC1.

The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. As a result, the capacitor C8 is charged quicker, the switching element Q1 is turned off earlier, and energy to be saved in the transformer T1 is reduced, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. As a consequence, the capacitor C8 is charged slower, the switching element Q1 is turned off later, and energy to be saved in the transformer T1 increases, thus making the output voltage Vo higher. Hence, the detection voltage of the shunt regulator IC1 becomes constant, i.e., the output voltage Vo becomes constant.

Overcurrent protection will be explained below. As an arrangement for overcurrent protection, the circuit comprises the transistor Q2 and the resistor R4 connected between the base and emitter of the transistor Q2.

As the load R1 becomes smaller, the electrical current on the primary side of the transformer T1 increases, i.e., the electrical current supplied to the resistor R4 increases. When the voltage produced across the two terminals of the resistor R4 has exceeded Vbe of the transistor Q2, it turns on the transistor Q2 and turns off the switching element Q1. That is, the peak electrical current on the primary side of the transformer T1 is limited to a given value.

The first embodiment can provide a voltage resonance power supply, which requires neither a detection circuit that detects zero drain voltage nor a gate-direction electrical current switching circuit that controls the gate, and switches at zero voltage (switches from OFF to ON in the non-resonance state). No extra inductors are used, and the transformer can have a loosely coupled structure, i.e., an inexpensive, split-winding transformer with a simple structure, can be used.

Figure 3:
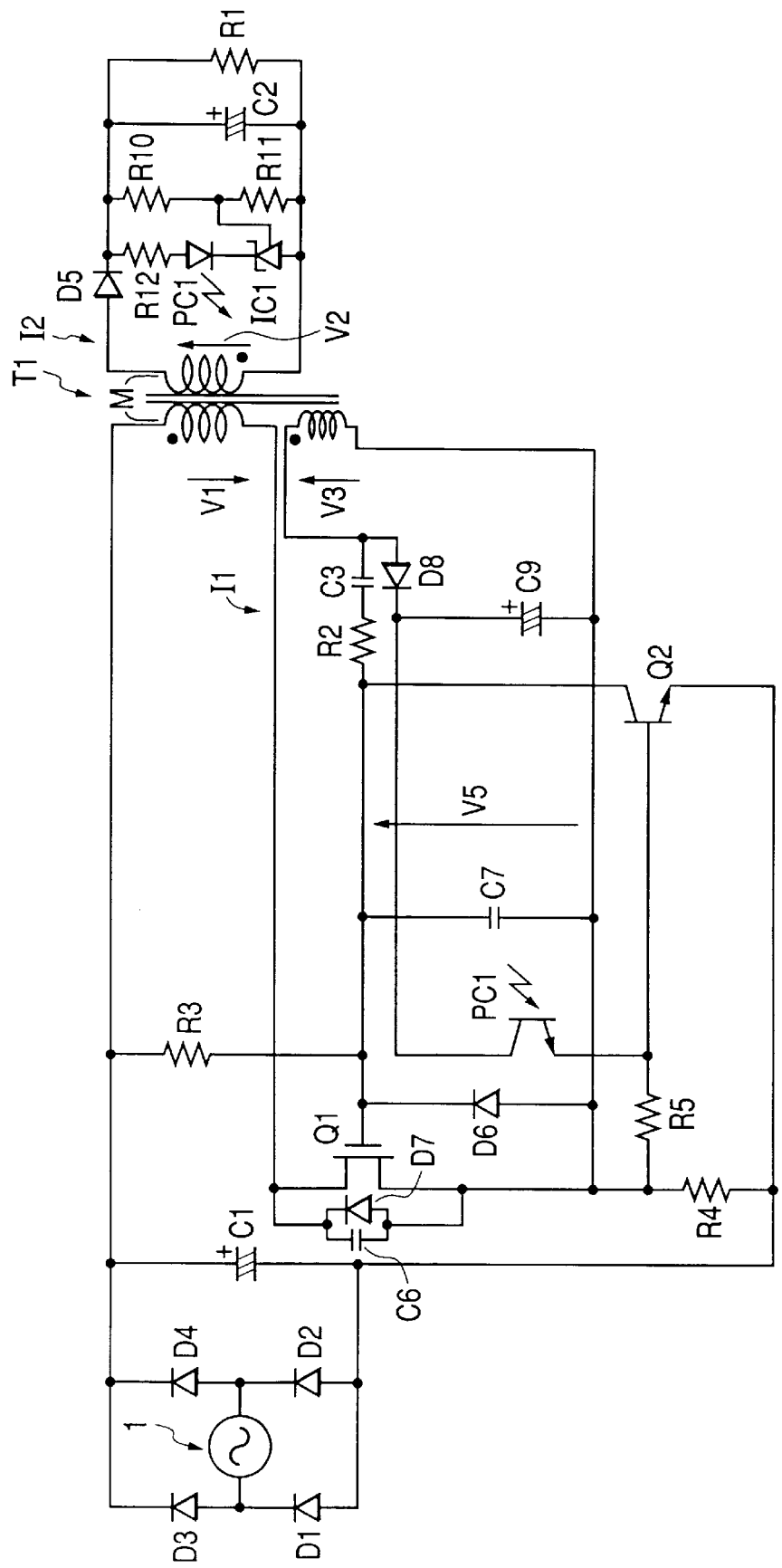
FIG. 3 is a circuit diagram showing the first modification of the power supply device according to the first embodiment of the present invention shown in FIG. 1.

FIG. 3 shows the first modification of the power supply device shown in FIG. 1 according to the first embodiment of the present invention.

The power supply device shown in FIG. 3 comprises a commercial power supply 1, a leakage transformer T1, a switching element Q1 comprising, e.g., a FET, a transistor Q2, diodes D1, D2, D3, D4, D5, D6, D7, and D8, a shunt regulator IC1, a photocoupler PC1, electrolytic capacitors C1, C2, and C9, capacitors C3, C6, and C7, and resistors R1, R2, R3, R4, R10, R11, and R12.

Since the difference from the first embodiment lies in the arrangement for controlling the output voltage and that for overcurrent protection (i.e., the first modification employs an arrangement using a single common transistor Q2 in place of the arrangement for using the transistor Q3 for controlling the ON-OFF timing of the switching means and the arrangement using the transistor Q2 for overcurrent protection in the first embodiment), only the operation based on such arrangement will be explained below.

The method of controlling the output voltage Vo across the two terminals of the load R1 to be constant will be explained below. The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. As a result, a larger amount of electrical current is supplied to the resistor R5 to form a larger potential difference across the two terminals of the resistor R5, and the voltage produced across the two terminals of the resistors R4 and R5 exceeds Vbe of the transistor Q2 earlier, so as to turn on the transistor Q2 earlier, turn off the switching element Q1 earlier, and reduce energy to be saved in the transformer T1, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. Consequently, a smaller amount of electrical current is supplied to the resistor R5 to form a small potential difference across the two terminals of the resistor R5, and the voltage produced across the two terminals of the resistors R4 and R5 exceeds Vbe of the transistor Q2 later, so as to turn on the transistor Q2 later, turn off the switching element Q1 later, and increase energy to be saved in the transformer T1, thus making the output voltage Vo higher. Therefore, the detection voltage of the shunt regulator IC1 becomes constant, i.e., the output voltage Vo becomes constant.

Overcurrent protection will be explained below. As the load R1 becomes smaller, the electrical current on the primary side of the transformer T1 increases, the output voltage Vo drops, the light-emitting element of the photocoupler PC1 ceases to emit light, and its light-receiving element ceases to receive light, thus stopping flow of the electrical current. As a result, no electrical current is supplied to the resistor R5 to form zero potential difference across the two terminals of the resistor R5, and the voltage produced across the two terminals of the resistor R4 exceeds Vbe of the transistor Q2 to turn on the transistor Q2 and turn off the switching element Q1. At this time, the energy to be saved in the transformer T1 is maximized to provide overcurrent protection. As the resistor R1 decreases, the output voltage Vo lowers. More specifically, the output voltage can be controlled to a predetermined voltage without requiring the transistor Q3 and capacitor C8 that form a portion of the self-excited oscillation circuit of the first embodiment. Also, overcurrent protection can be achieved at the same time.

Figure 4:
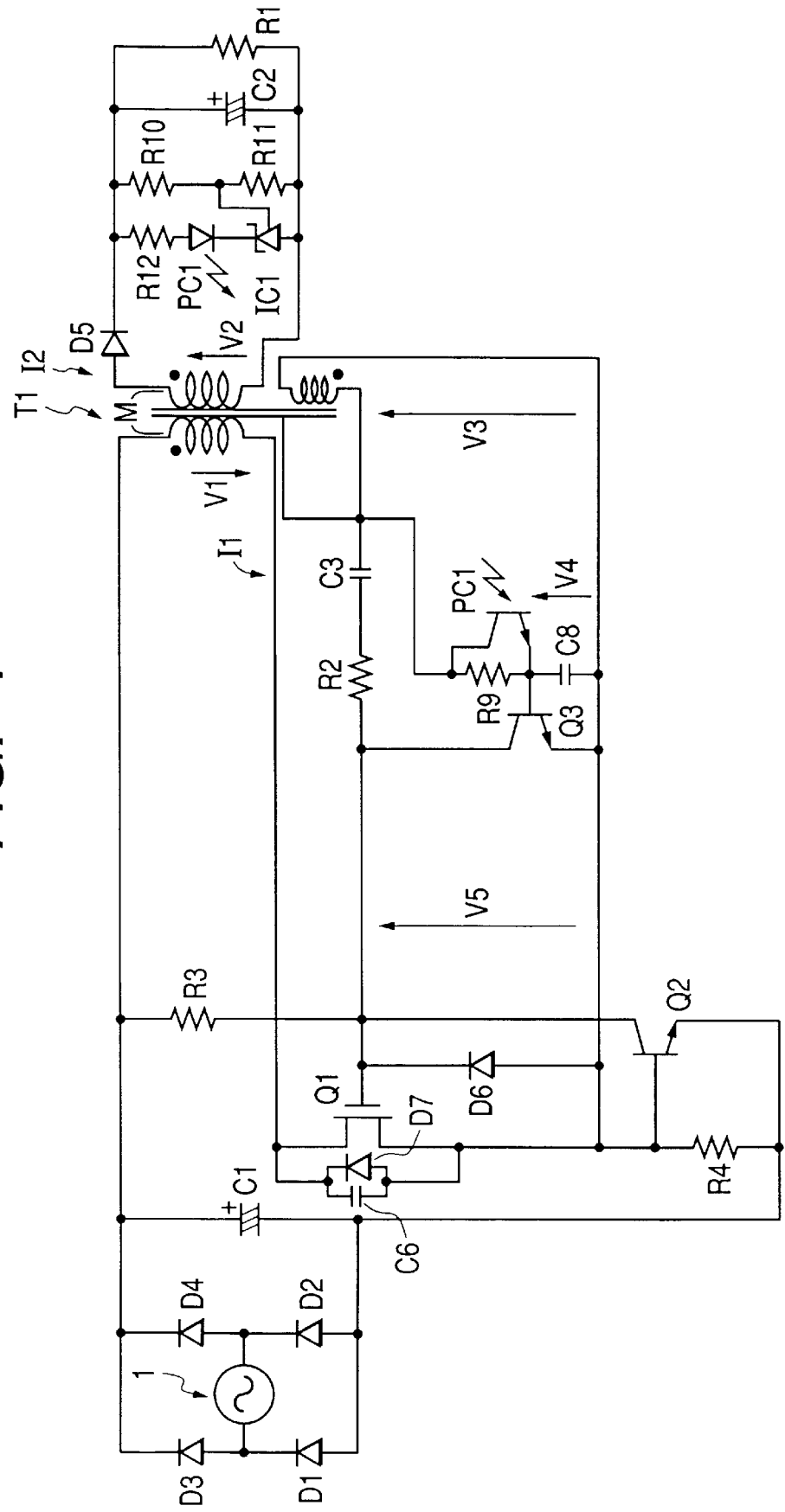
FIG. 4 is a circuit diagram showing the second modification of the power supply device according to the first embodiment of the present invention shown in FIG. 1.

FIG. 4 shows the second modification of the power supply device shown in FIG. 1 according to the first embodiment of the present invention.

The power supply device shown in FIG. 4 comprises a commercial power supply 1, a leakage transformer T1, a switching element Q1 comprising, e.g., a FET, transistors Q2 and Q3, diodes D1, D2, D3, D4, D5, D6, and D7, a shunt regulator IC1, a photocoupler PC1, electrolytic capacitors C1 and C2, capacitors C3, C6, and C8, and resistors R1, R2, R3, R4, R9, R10, R11, and R12.

Since the difference from the first embodiment lies in the circuit arrangement for driving the switching element (in the second modification, a control winding (second output winding) for generating the voltage V3 is set to be appropriately coupled to both the input and output windings, so that the voltage V3 has nearly a synthesized waveform of the outputs from these windings, in place of the phase delay means constituted by the resistor R2 and capacitor C7 in the first embodiment), only the operation based on the different circuit arrangement will be explained below.

More specifically, the state of the switching element in states a to e will be described below. In state a, the switching element Q1 is ON, as described above. The transistor Q3 is turned on to turn off the switching element Q1, shifting to state b. In states b and c, the voltage V3 drops to a value that can maintain the switching element Q1 OFF. After that, the voltage V3 drops below a voltage equal to or lower than Vbe of the transistor Q3 to discharge the capacitor C8 via the resistor R9. As a result, the voltage V3 turns off the transistor Q3 and maintains the switching element Q1 OFF. The voltage V3 then rises due to resonance, and maintains the switching element Q1 OFF via the capacitor C3 and resistor R2.

In state d, the winding for V3 is set to be appropriately coupled between the windings for V1 and V2, so that the voltage of the capacitor C3 further rises to switch the switching element Q1 to ON at a timing between the voltage waveforms V1 and V2.

In state e, the switching element Q1 is maintained ON.

As described above, by repeating from states a to e, energy is saved in the transformer T1 in the ON state of the switching element Q1, and is radiated therefrom in the OFF state of the switching element Q1, thus obtaining an output at the secondary side. That is, a voltage resonance power supply which can control drive of the gate more stably and can attain zero voltage switching (can switch the switching means from OFF to ON in the non-resonance state) without requiring a capacitor can be provided.

Figure 5:
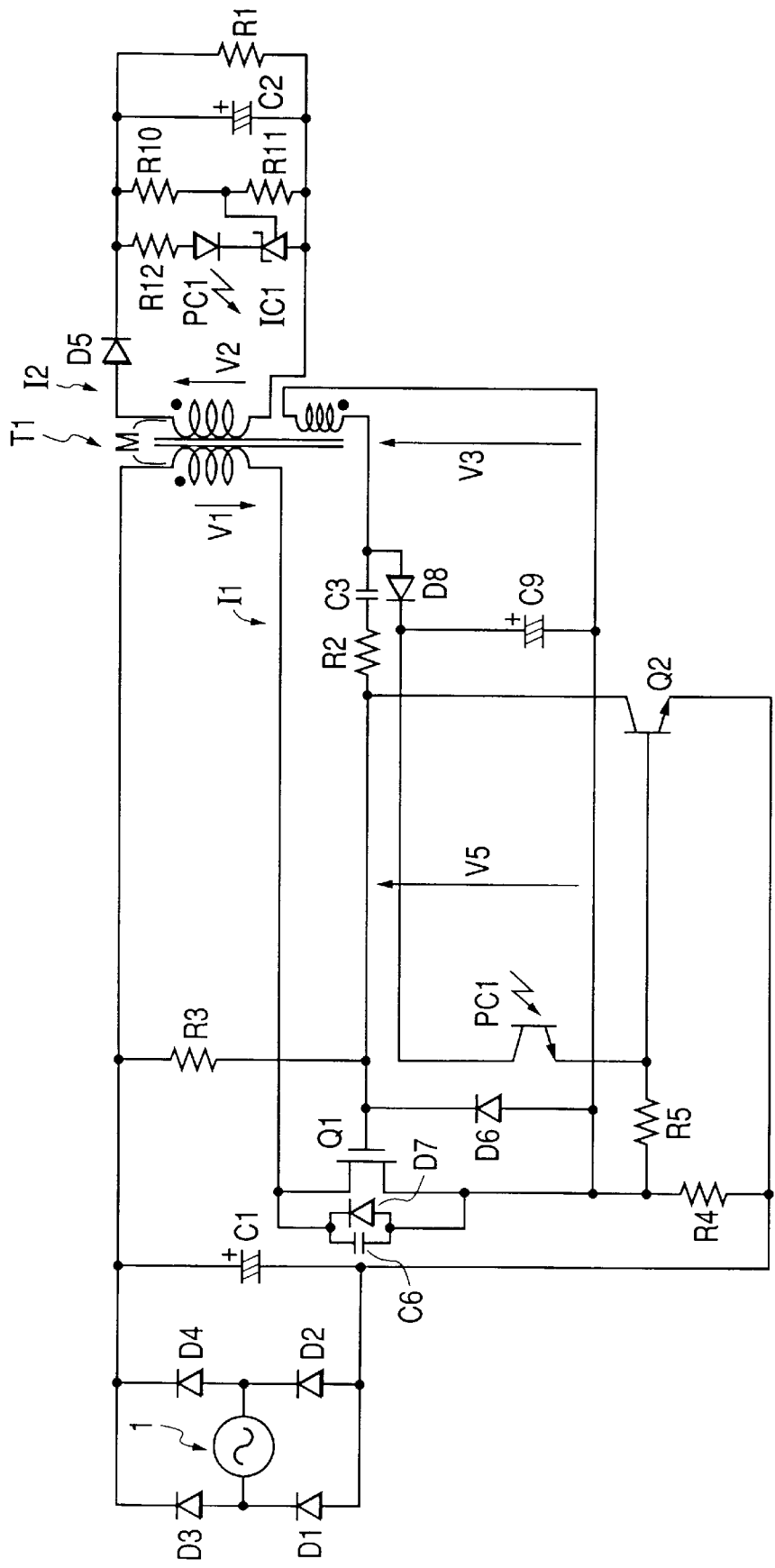
FIG. 5 is a circuit diagram showing the third modification of the power supply device according to the first embodiment of the present invention shown in FIG. 1.

FIG. 5 shows the third modification of the power supply device shown in FIG. 1 according to the first embodiment of the present invention.

The power supply device shown in FIG. 5 comprises a commercial power supply 1, a leakage transformer T1, a switching element Q1 comprising, e.g., a FET, a transistor Q2, diodes D1, D2, D3, D4, D5, D6, D7, and D8, a shunt regulator IC1, a photocoupler PC1, electrolytic capacitors C1 and C2, capacitors C3 and C6, and resistors R1, R2, R3, R4, R10, and R12.

Since the difference from the second modification lies in the arrangement for controlling the output voltage and that for overcurrent protection (that is, the third modification employs an arrangement using a single common transistor Q2 in place of the arrangement for using the transistor Q3 for controlling the ON-OFF timing of the switching means and the arrangement using the transistor Q2 for overcurrent protection in the second modification), only the operation based on such arrangement will be explained below.

The method of controlling the output voltage Vo across the two terminals of the load R1 to be constant will be explained below. The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. As a consequence, a larger amount of electrical current is supplied to the resistor R5 to form a larger potential difference across the two terminals of the resistor R5, and the voltage produced across the two terminals of the resistors R4 and R5 exceeds Vbe of the transistor Q2 earlier, so as to turn on the transistor Q2 earlier, turn off the switching element Q1 earlier, and reduce energy to be saved in the transformer T1, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. Hence, a smaller amount of electrical current is supplied to the resistor R5 to form a small potential difference across the two terminals of the resistor R5, and the voltage produced across the two terminals of the resistors R4 and R5 exceeds Vbe of the transistor Q2 later, so as to turn on the transistor Q2 later, turn off the switching element Q1 later, and increase energy to be saved in the transformer T1, thus making the output voltage Vo higher. Therefore, the detection voltage of the shunt regulator IC1 becomes constant, i.e., the output voltage Vo becomes constant.

Overcurrent protection will be explained below. As the load R1 becomes smaller, the electrical current on the primary side of the transformer T1 increases, the output voltage Vo drops, the light-emitting element of the photocoupler PC1 ceases to emit light, and its light-receiving element ceases to receive light, thus stopping flow of the electrical current. As a result, no electrical current is supplied to the resistor R5 to form zero potential difference across the two terminals of the resistor R5, and the voltage produced across the two terminals of the resistor R4 exceeds Vbe of the transistor Q2 to turn on the transistor Q2, and turn off the switching element Q1. At this time, the energy to be saved in the transformer T1 is maximized to provide overcurrent protection. As the resistor R1 decreases, the output voltage Vo lowers. More specifically, the output voltage can be controlled to a predetermined voltage without requiring the transistor Q3 and capacitor C8 that form a portion of the self-excited oscillation circuit of the second modification. Also, overcurrent protection can be achieved at the same time.

The second embodiment of the present invention will be described below.

The first embodiment described above has exemplified the flyback system that transfers energy when the switching means is OFF. The second embodiment will exemplify a forward system which transfers energy when the switching means is ON.

Figure 6:
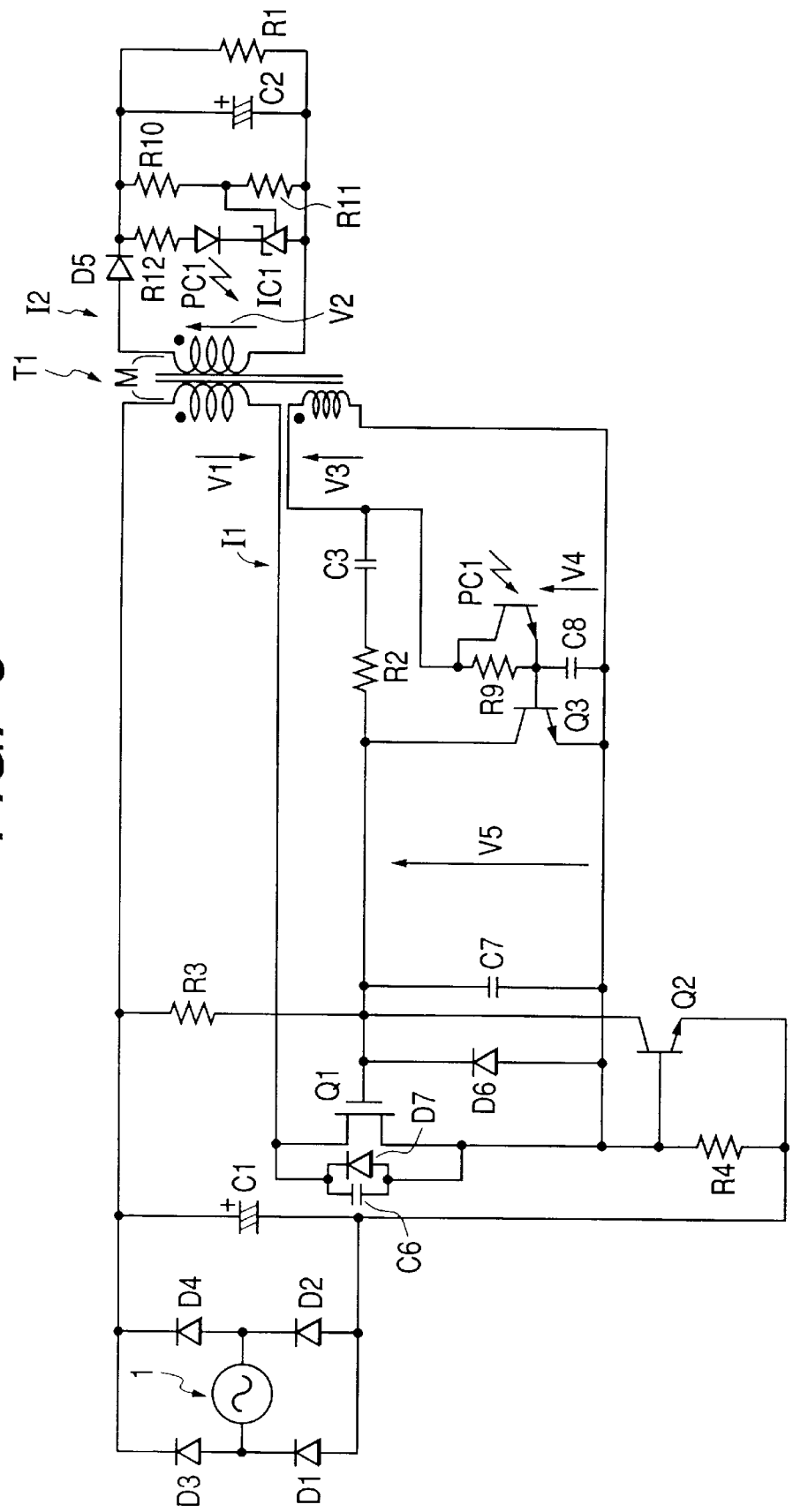
FIG. 6 is a circuit diagram of a power supply device according to the second embodiment of the present invention.
Figure 7:
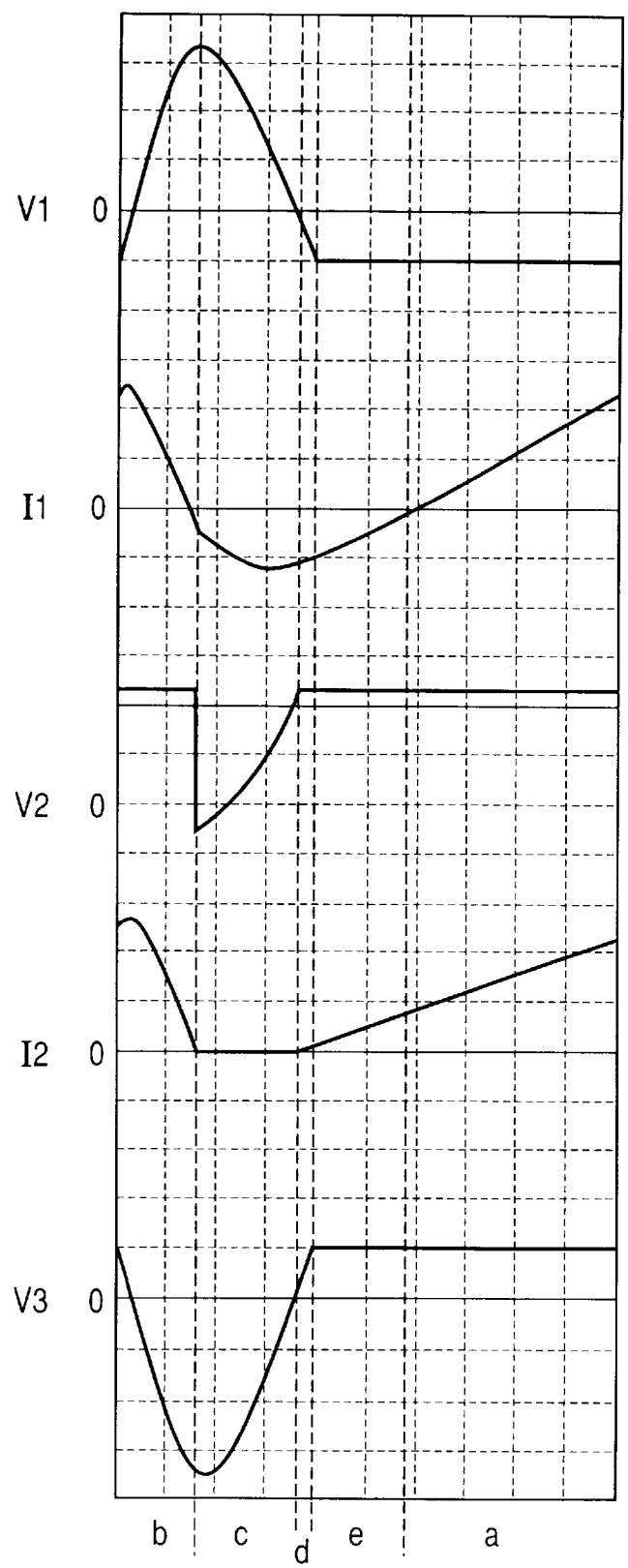
FIG. 7 is a waveform chart of principal part of the power supply device shown in FIG. 6.

FIG. 6 shows a power supply device according to the second embodiment of the present invention, and FIG. 7 shows the waveforms of the respective units. In FIG. 6, the power supply device comprises a commercial power supply 1, a leakage transformer T1, a switching element Q1 comprising, e.g., a FET, transistors Q2 and Q3, diodes D1, D2, D3, D4, D5, D6, and D7, a shunt regulator IC1, a photocoupler PC1, electrolytic capacitors C1, C2, and C9, capacitors C3, C6, C7, and C8, and resistors R1, R2, R3, R4, R9, R10, R11, and R12.

Let I1 and I2 be the electrical currents that flow in the windings of the transformer T1 in correspondence with voltages V1 and V2, L1 and L2 be the self-inductances of the windings, M be the mutual inductance of the two windings, and N be the turn ratio. Also, the coupling coefficient is given by $K=M/\sqrt{(L1 \cdot L2)}$.

The operation of the above-mentioned power supply circuit will be explained below. The power supply circuit is designed as a self-excited oscillation circuit, and repeats a series of states. Hence, an explanation will be given along with states a to e shown in FIG. 7, starting from state a, in which the switching operation is activated. A voltage of the commercial power supply 1 is rectified by the diodes D1, D2, D3, and D4, and is smoothed by the electrolytic capacitor C1, thus obtaining a DC voltage across the two terminals of the capacitor C1.

After the DC voltage is obtained across the two terminals of the capacitor C1, an electrical current flows in the resistor R3 to turn on the switching element Q1, to drive the primary side of the transformer T1, and to obtain outputs at the two windings of the transformer T1, thus activating first switching operation.

Assuming that the voltage across the two terminals of the electrolytic capacitor C1 is Vin (positive) when the switching element Q1 is ON and the diode D5 is OFF, the voltage V1 becomes about −Vin, and the output voltage V2 becomes approximately equal to a voltage Vo across the two terminals of the capacitor C2. Hence, the electrical current I1 increases at a rate of about $(Vin-K \cdot N \cdot Vo)/(L1 \cdot (1-K^2))$ per unit time. Also, the electrical current I2 increases at a rate of about $(K \cdot Vin-N \cdot Vo)/(L1 \cdot (1-K^2))$ per unit time.

A voltage V3 is positive, and turns on the switching element Q1 via the capacitor C3 and resistor R2. However, when the voltage V3 (positive) charges the capacitor C8 via the resistor R9, and a voltage V4 has reached Vbe (base potential) of the transistor Q3, the transistor Q3 is turned on to turn off the switching element Q1. The above-mentioned state is state a in FIG. 7.

When the switching element Q1 is OFF, the voltage V1 rises since the capacitance of the capacitor C6 resonates with a leakage inductance component $L1 \cdot (1-K^2)$. The voltage V2 is Vo. The electrical currents I1 and I2 flow as resonance electrical currents, and the electrical current I2 becomes zero eventually to turn off the diode D5. The above-mentioned state is state b in FIG. 7.

When the diode D5 is OFF, the capacitor C6 resonates with the inductance L1, and the voltage V2 rises to a voltage Vo before long, thus enabling the diode D5. The voltage V1 becomes the same resonance state as V2. The electrical current I1 flows as a resonance electrical current, and the electrical current I2 is zero. The above-mentioned state is state c in FIG. 7.

The diode D5 is enabled, the voltage V2 becomes nearly equal to the voltage Vo, and the voltage V1 becomes equal to a voltage −Vin eventually as a result of resonance between the capacitance of the capacitor C6 and leakage inductance component $L1 \cdot (1-K^2)$. Both the electrical currents I1 and I2 resonate. The above-mentioned state is state d in FIG. 7.

When the rectification diode on the secondary side is OFF, the inductance seen from the primary side is the self-inductance L1; when the rectification diode on the secondary side is OFF, the inductance seen from the primary side is the leakage inductance component $L1(1-K^2)$. For example, when a loosely coupled transformer having a coupling coefficient K=0.84 is used, this results in the use of a transformer having a relatively large leakage inductance component of about 0.3 L1. As a consequence, the voltage V1 in FIG. 7 has a voltage waveform that rises and falls slowly.

When the diodes D7 and D5 are ON, the voltage V1 is −Vin, the voltage V2 is approximately equal to the voltage Vo, and the electrical current I1 increases at a rate of about $(Vin-K \cdot N \cdot Vo)/(L1 \cdot (1-K^2))$ per unit time. The current value becomes positive before along, and the diode D7 is turned off. The electrical current I2 increases at a rate of about $(K \cdot Vin-N \cdot Vo)/(L1 \cdot (1-K^2))$ per unit time. The above-mentioned state is state e in FIG. 7.

The state of the switching element Q1 from state a to state e will be described below. In state a, the switching element Q1 is ON, as described above. The transistor Q3 is turned on to turn off the switching element Q1, entering state b.

In states b, c, and d, the voltage V3 drops to a value that maintains the switching element Q1 OFF, and then drops below a voltage equal to or lower than Vbe of the switching element Q3 to discharge the capacitor C8 via the resistor R9, thus turning off the transistor Q3 and maintaining the switching element Q1 OFF.

Then, the voltage V3 rises due to resonance, and charges the capacitor C7 via the capacitor C3 and resistor R2. However, by selecting the capacitor C7 to have an appropriate value, the switching element Q1 is maintained OFF.

In state e (non-resonance state), the capacitance of the capacitor C7 is selected to have an appropriate value, so that the voltage of the capacitor C7 further rises to switch the switching element Q1 to ON (note that the capacitance of the capacitor C7 is also selected to have a value that maintains the switching element Q1 OFF in states b, c, and d, as described above).

Putting this in other words, i.e., when the function of the capacitor C7 is examined in terms of the relationship between the voltages V3 and V5 (for example, the gate-source voltage when the switching element Q1 comprises a FET as in the illustrated embodiment), the capacitor C7 forms a phase delay circuit together with the resistor R2. Hence, the phase of the voltage V5 (its waveform is not shown) is delayed from that of the voltage V3. As a result, the voltage V3 becomes zero in states b, c, and d (resonance states), while the voltage V5 becomes zero in state e (non-resonance state) (of course, the capacitance of the capacitor C7 is selected in advance to set the voltage V5 zero in the non-resonance state). More specifically, when the reverse bias applied across the gate and source of the switching element Q1 comprising the FET disappears, and the voltage V5 as the ON condition for the FET has become zero, the switching element Q1 is turned on. In state e, the switching element Q1 is maintained ON.

As described above, by repeating from states a to e, the transformer T1 saves energy and supplies it to the secondary side in the ON state of the switching element Q1, and can resonate in the OFF state of the switching element Q1.

The switching element Q1 is turned on in state e, and is turned off upon switching from state a to state b. More specifically, the switching element Q1 is switched at a voltage of 0 V (i.e., is switched from OFF to ON in the non-resonance state), thus realizing a voltage resonance power supply free from any switching losses.

In states b and d, appropriate resonance between the capacitance of the capacitor C6 and the leakage inductance component $L1 \cdot (1-K^2)$ can be obtained using a loosely coupled transformer. In state c, appropriate resonance between the capacitance of the capacitor C6 and inductance L1 can be attained using a loosely coupled transformer.

The method of controlling the output voltage Vo across the two terminals of the load R1 to be constant will be explained below. As an arrangement for voltage control, the circuit comprises a voltage divider formed by the resistors R10 and R11, the shunt regulator IC1 for detecting the voltage divided by the voltage divider, and generating a voltage according to the detected voltage, the photocoupler PC1 for changing the amount of light to be emitted by its light-emitting element according to the voltage generated by the shunt regulator IC1, thereby changing the amount of light to be received by its light-receiving element, and a means (transistor Q3, capacitor C8, and the like) for controlling the ON-to-OFF switching timing of the switching element Q1 in accordance with the electrical current value changed by the photocoupler PC1.

The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. Thus, the capacitor C8 is charged quicker, the switching element Q1 is turned off earlier, and energy to be saved in the transformer T1 is reduced, thus lowering the output voltage Vo. When the output voltage Vo is low, the light-emitting element of the photocoupler PC1 emits a smaller amount of light, and its light-receiving element receives a smaller amount of light, thus decreasing the electrical current that flows in the photocoupler PC1. As a result, the capacitor C8 is charged slower, the switching element Q1 is turned off later, and energy to be saved in the transformer T1 increases, thus making the output voltage Vo higher. Hence, the detection voltage of the shunt regulator IC1 becomes constant, i.e., the output voltage Vo becomes constant.

Overcurrent protection will be explained below. As an arrangement for overcurrent protection, the circuit comprises the transistor Q2 and the resistor R4 connected between the base and emitter of the transistor Q2.

As the load R1 becomes smaller, the electrical current on the primary side of the transformer T1 increases, i.e., the electrical current supplied to the resistor R4 increases. When the voltage produced across the two terminals of the resistor R4 has exceeded Vbe of the transistor Q2, it turns on the transistor Q2 and turns off the switching element Q1. That is, the peak electrical current on the primary side of the transformer T1 is limited to a given value.

That is, a voltage resonance power supply, which requires neither a detection circuit that detects zero drain voltage nor a gate-direction electrical current switching circuit that controls the gate, and switches at zero voltage (switches from OFF to ON in the non-resonance state) can be provided. No extra inductors are used, and the transformer can have a loosely coupled structure, i.e., an inexpensive, split-winding transformer with a simple structure, can be used.

Figure 8:
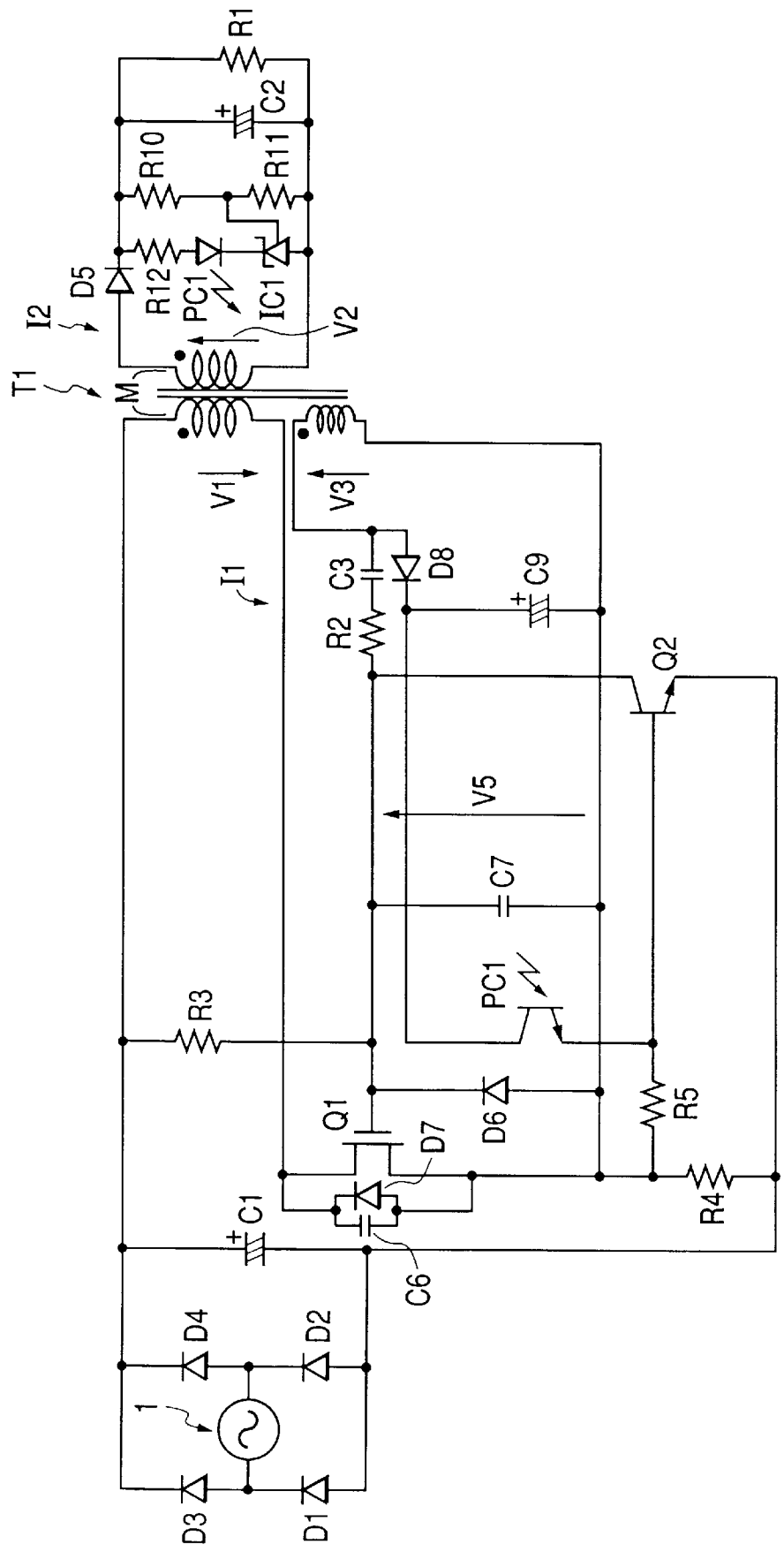
FIG. 8 is a circuit diagram showing a modification of the power supply device according to the second embodiment of the present invention shown in FIG. 6.

FIG. 8 shows a modification of the power supply device shown in FIG. 6 according to the second embodiment of the present invention.

The power supply device shown in FIG. 8 comprises a commercial power supply 1, a leakage transformer T1, a switching element Q1 comprising, e.g., a FET, a transistor Q2, diodes D1, D2, D3, D4, D5, D6, D7, and D8, a shunt regulator IC1, a photocoupler PC1, electrolytic capacitors C1, C2, and C9, capacitors C3, C6, and C7, and resistors R1, R2, R3, R4, R10, R11, and R12.

Since the difference from the second embodiment resides in the arrangement for controlling the output voltage and that for overcurrent protection (i.e., this modification employs an arrangement using a single common transistor Q2 in place of the arrangement for using the transistor Q3 for controlling the ON-OFF timing of the switching means and the arrangement using the transistor Q2 for overcurrent protection in the second embodiment), only the operation based on such arrangement will be explained below.

The method of controlling the output voltage Vo across the two terminals of the load R1 to be constant will be explained below. The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. So, a larger amount of electrical current is supplied to the resistor R5 to form a larger potential difference across the two terminals of the resistor R5, and the voltage produced across the two terminals of the resistors R4 and R5 exceeds Vbe of the transistor Q2 earlier, so as to turn on the transistor Q2 earlier, turn off the switching element Q1 earlier, and reduce energy to be saved in the transformer T1, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. Consequently, a smaller amount of electrical current is supplied to the resistor R5 to form a small potential difference across the two terminals of the resistor R5, and the voltage produced across the two terminals of the resistors R4 and R5 exceeds Vbe of the transistor Q2 later, so as to turn on the transistor Q2 later, turn off the switching element Q1 later, and increase energy to be saved in the transformer T1, thus making the output voltage Vo higher. Therefore, the detection voltage of the shunt regulator IC1 becomes constant, i.e., the output voltage Vo becomes constant.

Overcurrent protection will be explained below. As the load R1 becomes smaller, the electrical current on the primary side of the transformer T1 increases, the output voltage Vo drops, the light-emitting element of the photocoupler PC1 ceases to emit light, and its light-receiving element ceases to receive light, thus stopping flow of the electrical current. As a result, no electrical current is supplied to the resistor R5 to form zero potential difference across the two terminals of the resistor R5, and the voltage produced across the two terminals of the resistor R4 exceeds Vbe of the transistor Q2 to turn on the transistor Q2, and turn off the switching element Q1. At this time, the energy to be saved in the transformer T1 is maximized to provide overcurrent protection. As the resistor R1 decreases, the output voltage Vo lowers. More specifically, the output voltage can be controlled to a predetermined voltage without requiring the transistor Q3 and capacitor C8 that form a portion of the self-excited oscillation circuit of the second embodiment. Also, overcurrent protection can be achieved at the same time.

The third embodiment of the present invention will be described below.

The first or second embodiment described above has exemplified a system that transfers energy when the switching means is either OFF or ON. However, the third embodiment will exemplify a system that can transfer energy independently of the ON/OFF state of the switching means.

Figure 9:
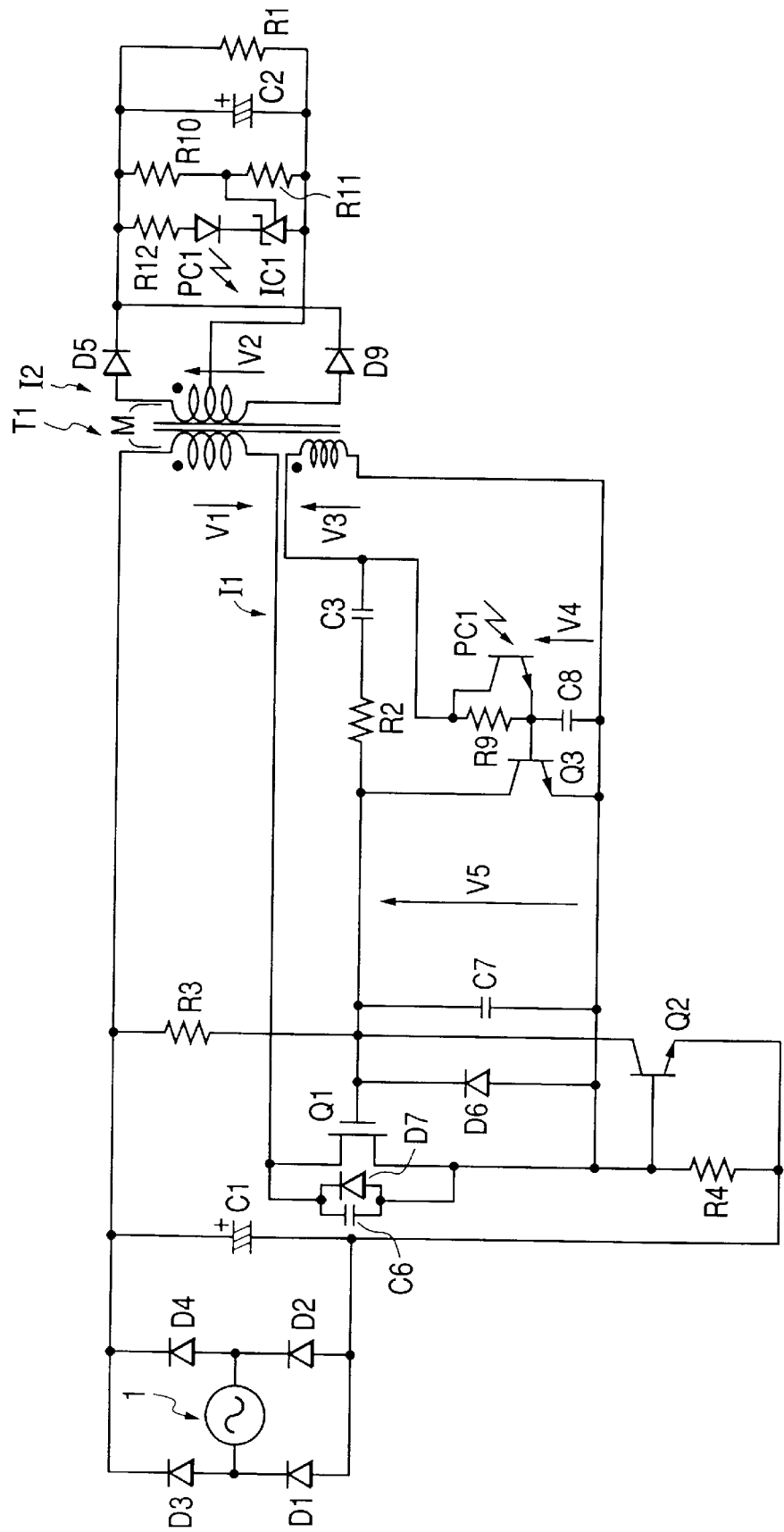
FIG. 9 is a circuit diagram of a power supply device according to the third embodiment of the present invention.
Figure 10:
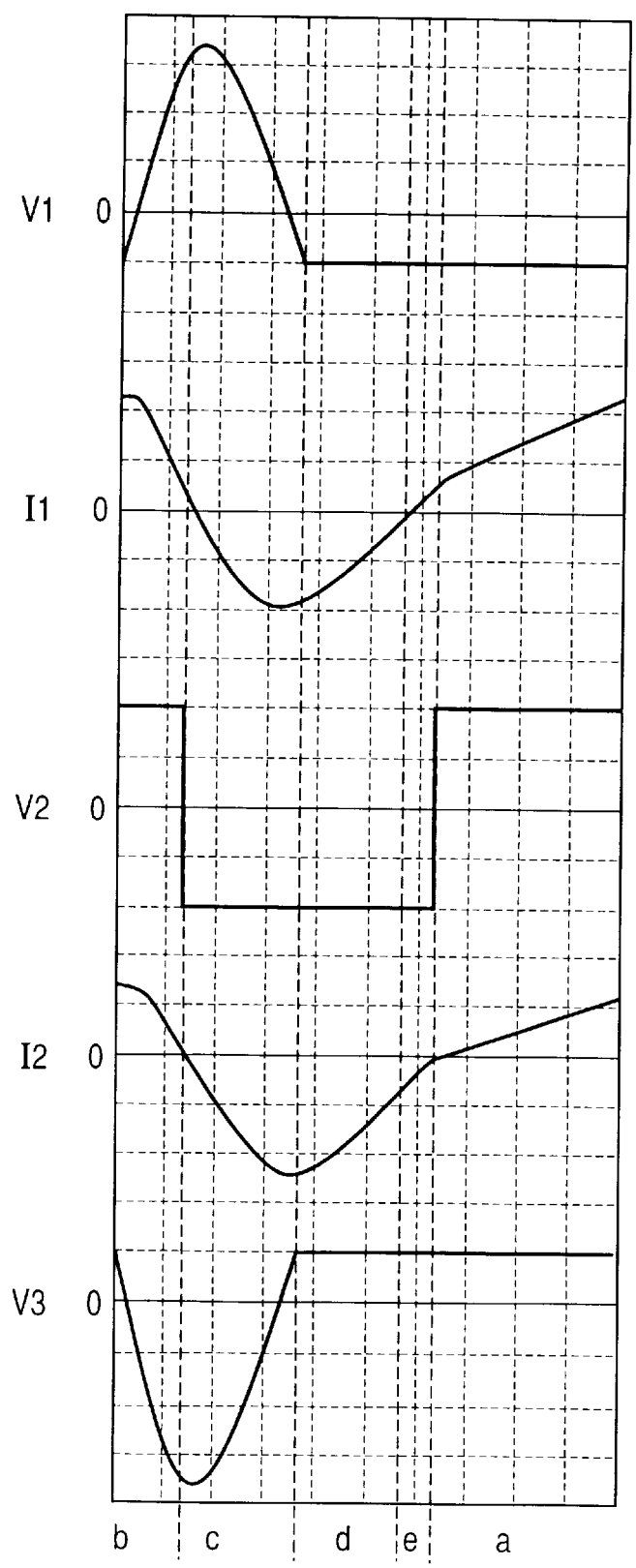
FIG. 10 is a waveform chart of principal part of the power supply device shown in FIG. 9.

FIG. 9 is a circuit diagram of a power supply device according to the third embodiment of the present invention, and FIG. 10 shows the waveforms of the respective units. In FIG. 9, the power supply device comprises a commercial power supply 1, a leakage transformer T1, a switching element Q1 comprising, e.g., a FET, transistors Q2 and Q3, diodes D1, D2, D3, D4, D5, D6, D7, and D9 a shunt regulator IC1, a photocoupler PC1, electrolytic capacitors C1 and C2, capacitors C3, C6, C7, and C8, and resistors R1, R2, R3, R4, R9, R10, R11, and R12.

Let I1 and I2 be the electrical currents that flow in windings of the transformer T1 in correspondence with voltages V1 and V2, L1 and L2 be the self-inductances of the windings, M be the mutual inductance of the two windings, and N be the turn ratio. Also, the coupling coefficient is given by $K=M/\sqrt{(L1 \cdot L2)}$.

The operation of the above-mentioned power supply circuit will be explained below. The power supply circuit is designed as a self-excited oscillation circuit, and repeats a series of states. Hence, an explanation will be given along with states a to e shown in FIG. 10, starting from state a, in which the switching operation is activated. An AC voltage of the commercial power supply 1 is rectified by the diodes D1, D2, D3, and D4, and is smoothed by the electrolytic capacitor C1, thus obtaining a DC voltage across the two terminals of the capacitor C1. When the DC voltage has been produced across the two terminals of the electrolytic capacitor C1, an electrical current flows in the resistor R3, and as a result, the switching element Q1 is turned on. Then, the primary side of the transformer T1 is driven, and outputs are produced in the two windings of the transformer T1, thus activating first switching operation.

Assuming that the voltage across the two terminals of the electrolytic capacitor C1 is Vin (positive) when the switching element Q1 is ON and the diode D5 is OFF, the voltage V1 becomes about –Vin, and the output voltage V2 becomes approximately equal to a voltage Vo across the two terminals of the capacitor C2. Hence, the electrical current I1 increases at a rate of about $(Vin-K \cdot N \cdot Vo)/(L1 \cdot (1-K^2))$ per unit time. Also, the electrical current I2 increases at a rate of about $(K \cdot Vin-N \cdot Vo)/(L1 \cdot (1-K^2))$ per unit time. A voltage V3 is positive, and turns on the switching element Q1 via the capacitor C3 and resistor R2.

However, when the voltage V3 charges the capacitor C8 via the resistor R9 and when a voltage V4 has reached Vbe (base potential) of the transistor Q3, the transistor Q3 is turned on to turn off the switching element Q1. The above-mentioned state is state a in FIG. 10.

When the switching element Q1 is OFF, the voltage V1 rises since the capacitance of the capacitor C6 resonates with a leakage inductance component $L1 \cdot (1-K^2)$. The electrical current I2 flows as a resonance electrical current, and eventually becomes zero.

At this time, the diode D5 changes from ON to OFF, the diode D9 changes from OFF to ON, and the voltage V2 changes from Vo to –Vo. The electrical current I1 flows as a resonance electrical current. The above-mentioned state is state b in FIG. 10.

When the diode D9 is ON, the voltage V2 becomes nearly equal to the voltage Vo across the two terminals of the capacitor C2. As the capacitance of the capacitor C6 resonates with leakage inductance component $L1 \cdot (1-K^2)$, the voltage V1 rises and then falls. The voltage V1 becomes a voltage –Vin, thus enabling the diode D7. Both the electrical currents I1 and I2 flow as resonance electrical currents. The above-mentioned state is state c in FIG. 10.

When the rectification diode on the secondary side is OFF, the inductance seen from the primary side is the self-inductance L1; when the rectification diode on the secondary side is OFF, the inductance seen from the primary side is the leakage inductance component $L1(1-K^2)$. For example, when a loosely coupled transformer having a coupling coefficient K=0.84 is used, this results in the use of a transformer having a relatively large leakage inductance component of about 0.3 L1. As a consequence, the voltage V1 in FIG. 10 has a voltage waveform that rises and falls slowly.

When the diode D7 is enabled and the voltage V1 becomes a voltage –Vin, the voltage V2 becomes approximately equal to the voltage Vo, and the electrical current I1 increases at a rate of about $(Vin-K \cdot N \cdot Vo)/(L1 \cdot (1-K^2))$ per unit time. After that, the current value becomes positive and the diode D7 is turned off. The electrical current I2 increases at a rate of about $(K \cdot Vin+N \cdot Vo)/(L1 \cdot (1-K^2))$ per unit time. The above-mentioned state is state d in FIG. 10.

When the diode D7 is OFF and the switching element Q1 is ON, the voltage V1 is –Vin, and the voltage V2 becomes roughly equal to the voltage Vo. The electrical current I1 increases at a rate of about $(Vin+K \cdot N \cdot Vo)/(L1 \cdot (1-K^2))$ per unit time. On the other hand, the electrical current I2 increases at a rate of about $(K \cdot Vin+N \cdot Vo)/(L1 \cdot (1-K^2))$ per unit time. The current value becomes zero later on, the diode D9 changes from ON to OFF, and the diode D5 changes from OFF to ON. The above-mentioned state is state e in FIG. 10.

The state of the switching element Q1 from state a to state e will be described below. In state a, the switching element Q1 is ON, as described above. The transistor Q3 is turned on to turn off the switching element Q1, entering state b.

In states b and c, the voltage V3 begins to fall to a voltage that maintains the switching element Q1 OFF. After that, the voltage V3 falls below a voltage equal to or lower than Vbe of the transistor Q3 to discharge the capacitor C8, turn off the transistor Q3, and maintain the switching element Q1 OFF. Then, the voltage V3 rises due to resonance, and charges the capacitor C7 via the capacitor C3 and resistor R2. However, by selecting the capacitor C7 to have an appropriate value, the switching element Q1 is maintained OFF.

In state d (non-resonance state), the voltage of the capacitor C7 further rises to switch the switching element Q1 to ON. Note that the capacitance of the capacitor C7 is selected to have an appropriate value so as to switch the switching element Q1 to ON (note that the capacitance of the capacitor C7 is also selected to have a value that maintains the switching element Q1 OFF in states b and c, as described above).

Putting it differently, i.e., when the function of the capacitor C7 is examined in terms of the relationship between the voltages V3 and V5 (for example, the gate-source voltage when the switching element Q1 comprises a FET as in the illustrated embodiment), the capacitor C7 forms a phase delay circuit together with the resistor R2. Hence, the phase of the voltage V5 (its waveform is not shown) is delayed from that of the voltage V3. As a result, the voltage V3 becomes zero in state c (resonance state), while the voltage V5 becomes zero in state d (non-resonance state) (of course, the capacitance of the capacitor C7 is selected in advance to set the voltage V5 zero in the non-resonance state). More specifically, when the reverse bias applied across the gate and source of the switching element Q1 comprising the FET disappears, and the voltage V5 as the ON condition for the FET has become zero, the switching element Q1 is turned on.

In state e, the switching element Q1 is maintained ON.

As described above, by repeating from states a to e, the transformer T1 saves energy and supplies it to the secondary side in the ON state of the switching element Q1. The transformer T1 radiates energy in the OFF state of the switching element Q1, thus obtaining the output at the secondary side.

The switching element Q1 is turned on in state d, and is turned off upon switching from state a to state b. That is, the switching element Q1 is switched at the time of a voltage=0 V (it is switched from OFF to ON in the non-resonance state), thus providing a voltage resonance power supply free from any switching losses.

In states b and c, appropriate resonance between the capacitance of the capacitor C6 and leakage inductance component $L1 \cdot (1-K^2)$ can be obtained using a loosely coupled transformer.

The method of controlling the output voltage Vo across the two terminals of the load R1 to be constant will be explained below. As an arrangement for voltage control, the circuit comprises a voltage divider formed by the resistors R10 and R11, the shunt regulator IC1 for detecting the voltage divided by the voltage divider, and generating a voltage according to the detected voltage, the photocoupler PC1 for changing the amount of light to be emitted by its light-emitting element according to the voltage generated by the shunt regulator IC1, thereby changing the amount of light to be received by its light-receiving element, and a means (transistor Q3, capacitor C8, and the like) for controlling the ON-to-OFF switching timing of the switching element Q1 in accordance with the electrical current value changed by the photocoupler PC1.

The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. So, the capacitor C8 is charged quicker, the switching element Q1 is turned off earlier, and energy to be saved in the transformer T1 is reduced, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. As a result, the capacitor C8 is charged slower, the switching element Q1 is turned off later, and energy to be saved in the transformer T1 increases, thus making the output voltage Vo higher. Hence, the detection voltage of the shunt regulator IC1 becomes constant, i.e., the output voltage Vo becomes constant.

Overcurrent protection will be explained below. As an arrangement for overcurrent protection, the circuit comprises the transistor Q2 and the resistor R4 connected between the base and emitter of the transistor Q2.

As the load R1 becomes smaller, the electrical current on the primary side of the transformer T1 increases, i.e., the electrical current supplied to the resistor R4 increases. When the voltage produced across the two terminals of the resistor R4 has exceeded Vbe of the transistor Q2, the transistor Q2 is turned on, and the switching element Q1 is turned off. That is, the peak electrical current on the primary side of the transformer T1 is limited to a given value.

As described above, the third embodiment can provide a voltage resonance power supply, which requires neither a detection circuit that detects zero drain voltage nor a gate-direction electrical current switching circuit that controls the gate, and switches at zero voltage (switches from OFF to ON in the non-resonance state). No extra inductors are used, and the transformer can have a loosely coupled structure, i.e., an inexpensive, split-winding transformer with a simple structure, can be used.

Figure 11:
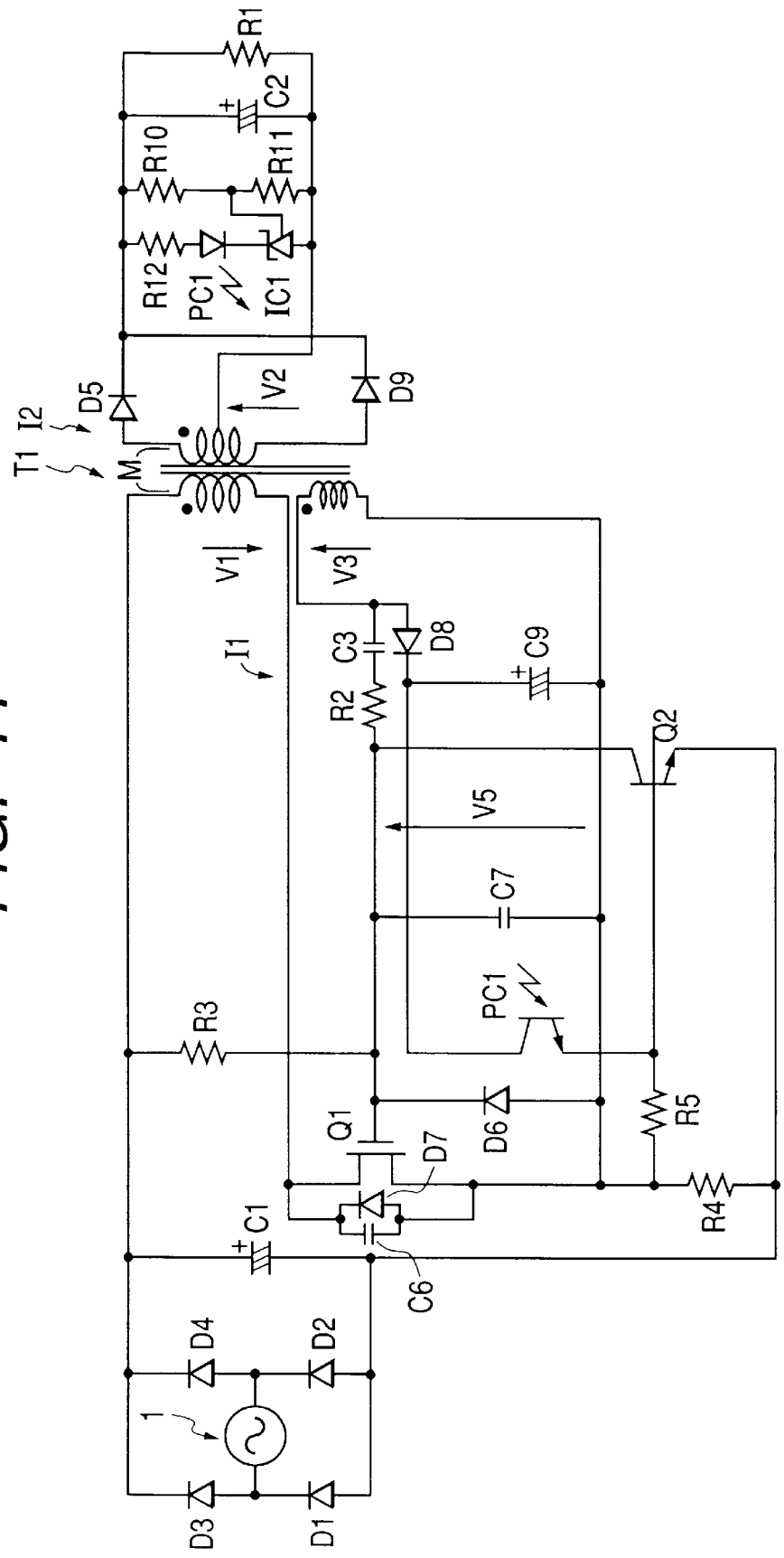
FIG. 11 is a circuit diagram showing the first modification of the power supply device according to the third embodiment of the present invention shown in FIG. 9.

FIG. 11 shows the first modification of the power supply device shown in FIG. 9 according to the third embodiment of the present invention.

The power supply device shown in FIG. 11 comprises a commercial power supply 1, a leakage transformer T1, a switching element Q1 comprising, e.g., a FET, a transistor Q2, diodes D1, D2, D3, D4, D5, D6, D7, D8, and D9, a shunt regulator IC1, a photocoupler PC1, electrolytic capacitors C1, C2, and C9, capacitors C3, C6, and C7, and resistors R, R2, R3, R4, R10, R11, and R12.

Since the difference from the third embodiment lies in the arrangement for controlling the output voltage and that for overcurrent protection (i.e., the first modification employs an arrangement using a single common transistor Q2 in place of the arrangement for using the transistor Q3 for controlling the ON-OFF timing of the switching means and the arrangement using the transistor Q2 for overcurrent protection in the third embodiment), only the operation based on such arrangement will be explained below.

The method of controlling the output voltage Vo across the two terminals of the load R1 to be constant will be explained below. The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. Accordingly, the potential difference across the two terminals of the resistor R5 becomes larger, and the voltage produced across the two terminals of the resistors R4 and R5 exceeds Vbe of the transistor Q2 earlier, so as to turn on the transistor Q2 earlier, turn off the switching element Q1 earlier, and reduce energy to be saved in the transformer T1, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. As a result, the potential difference across the two terminals of the resistor R5 becomes smaller, and the voltage produced across the two terminals of the resistors R4 and R5 exceeds Vbe of the transistor Q2 later, so as to turn on the transistor Q2 later, turn off the switching element Q1 later, and increase energy to be saved in the transformer T1, thus making the output voltage Vo higher. Therefore, the detection voltage of the shunt regulator IC1 becomes constant, i.e., the output voltage Vo becomes constant.

Overcurrent protection will be explained below. As the load R1 becomes smaller, the electrical current on the primary side of the transformer T1 increases, the output voltage Vo drops, the light-emitting element of the photocoupler PC1 ceases to emit light, and its light-receiving element ceases to receive light, thus stopping flow of the electrical current. As a result, no electrical current is supplied to the resistor R5 to form zero potential difference across the two terminals of the resistor R5, and the voltage produced across the two terminals of the resistor R4 exceeds Vbe of the transistor Q2 to turn on the transistor Q2, and turn off the switching element Q1. At this time, the energy to be saved in the transformer T1 is maximized to provide overcurrent protection. As the resistor R1 decreases, the output voltage Vo lowers. More specifically, the output voltage can be controlled to a predetermined voltage without requiring the transistor Q3 and capacitor C8 that form a portion of the self-excited oscillation circuit of the third embodiment. Also, overcurrent protection can be achieved at the same time.

Figure 12:
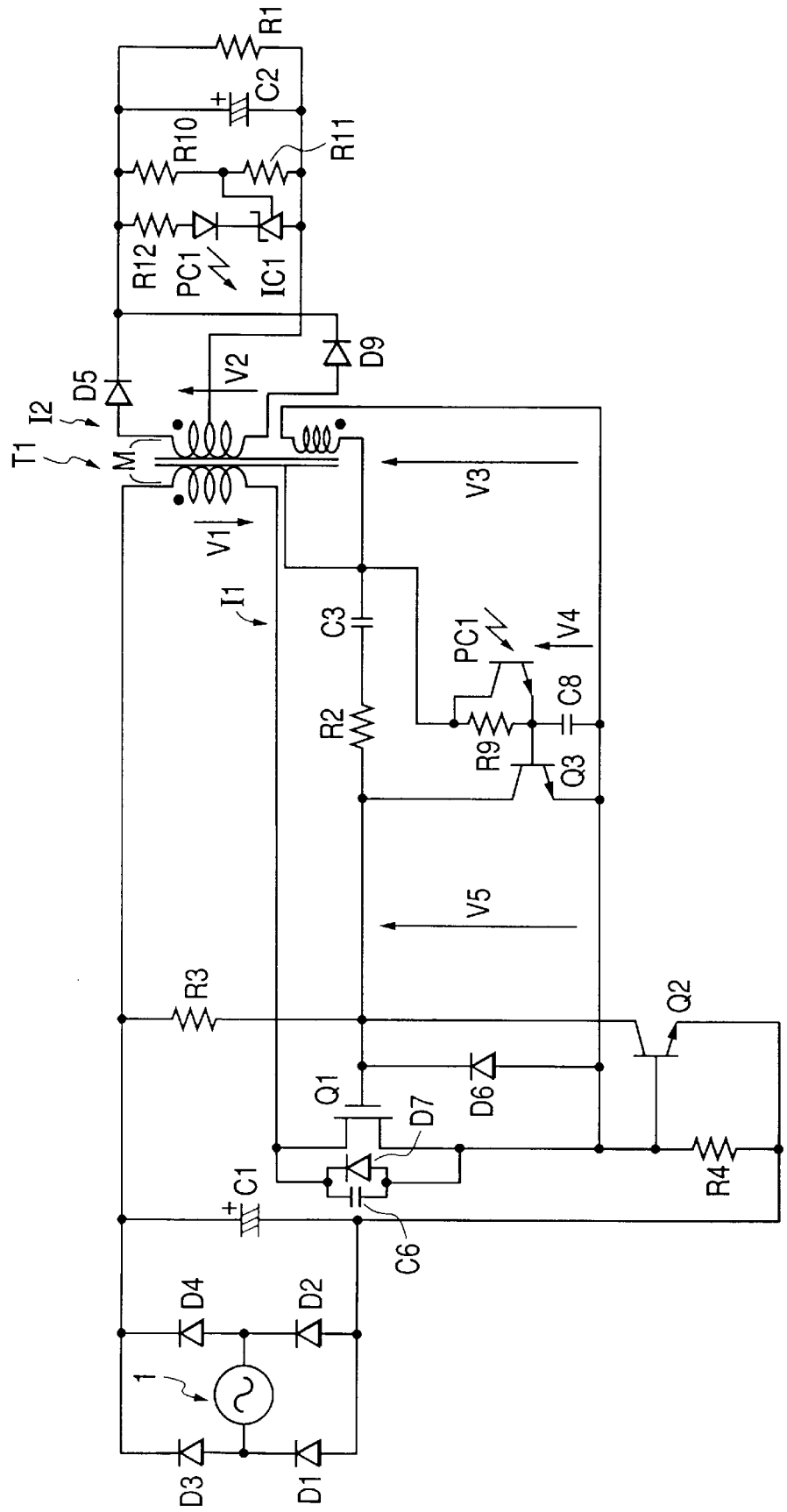
FIG. 12 is a circuit diagram showing the second modification of the power supply device according to the third embodiment of the present invention shown in FIG. 9.

FIG. 12 shows the second modification of the power supply device shown in FIG. 9 according to the third embodiment of the present invention.

The power supply device shown in FIG. 12 comprises a commercial power supply 1, a leakage transformer T1, a switching element Q1 comprising, e.g., a FET, transistors Q2 and Q3, diodes D1, D2, D3, D4, D5, D6, D7, and D9, a shunt regulator IC1, a photocoupler PC1, electrolytic capacitors C1 and C2, capacitors C3, C6, and C8, and resistors R1, R2, R3, R4, R9, R10, R11, and R12.

Since the difference from the third embodiment lies in the circuit arrangement for driving the switching element (in the second modification, the control winding (second output winding) for generating the voltage V3 is set to be appropriately coupled to both the input and output windings, so that the voltage V3 has nearly a synthesized waveform of the outputs from these windings, in place of the phase delay means constituted by the resistor R2 and capacitor C7 in the third embodiment), only the operation based on the different circuit arrangement will be explained below.

Hence, the state of the switching element in states a to e will be described below. In state a, the switching element Q1 is ON, as described above. The transistor Q3 is turned off to turn on the switching element Q1, shifting to state b.

In states b and c, the voltage V3 drops to a value that can maintain the switching element Q1 OFF. After that, the voltage V3 drops below a voltage equal to or lower than Vbe of the transistor Q3 to discharge the capacitor C8 via the resistor R9. As a result, the voltage V3 turns off the transistor Q3 and maintains the switching element Q1 OFF. The voltage V3 then rises due to resonance, and maintains the switching element Q1 OFF via the capacitor C3 and resistor R2.

In state d, the winding for V3 is set to be appropriately coupled between the windings for V1 and V2, so that the voltage of the capacitor C3 further rises to switch the switching element Q1 to ON at a timing between the voltage waveforms V1 and V2. For this reason, the switching element Q1 is switched from OFF to ON in state d (non-resonance state).

In state e, the switching element Q1 is maintained ON.

As described above, by repeating from states a to e, energy is saved in the transformer T1 in the ON state of the switching element Q1, and is radiated therefrom in the OFF state of the switching element Q1, thus obtaining an output at the secondary side. That is, a voltage resonance power supply which can control drive of the gate of the switching element Q1 more stably and can attain zero voltage switching (can switch the switching means from OFF to ON in the non-resonance state) without requiring a capacitor can be provided.

Figure 13:
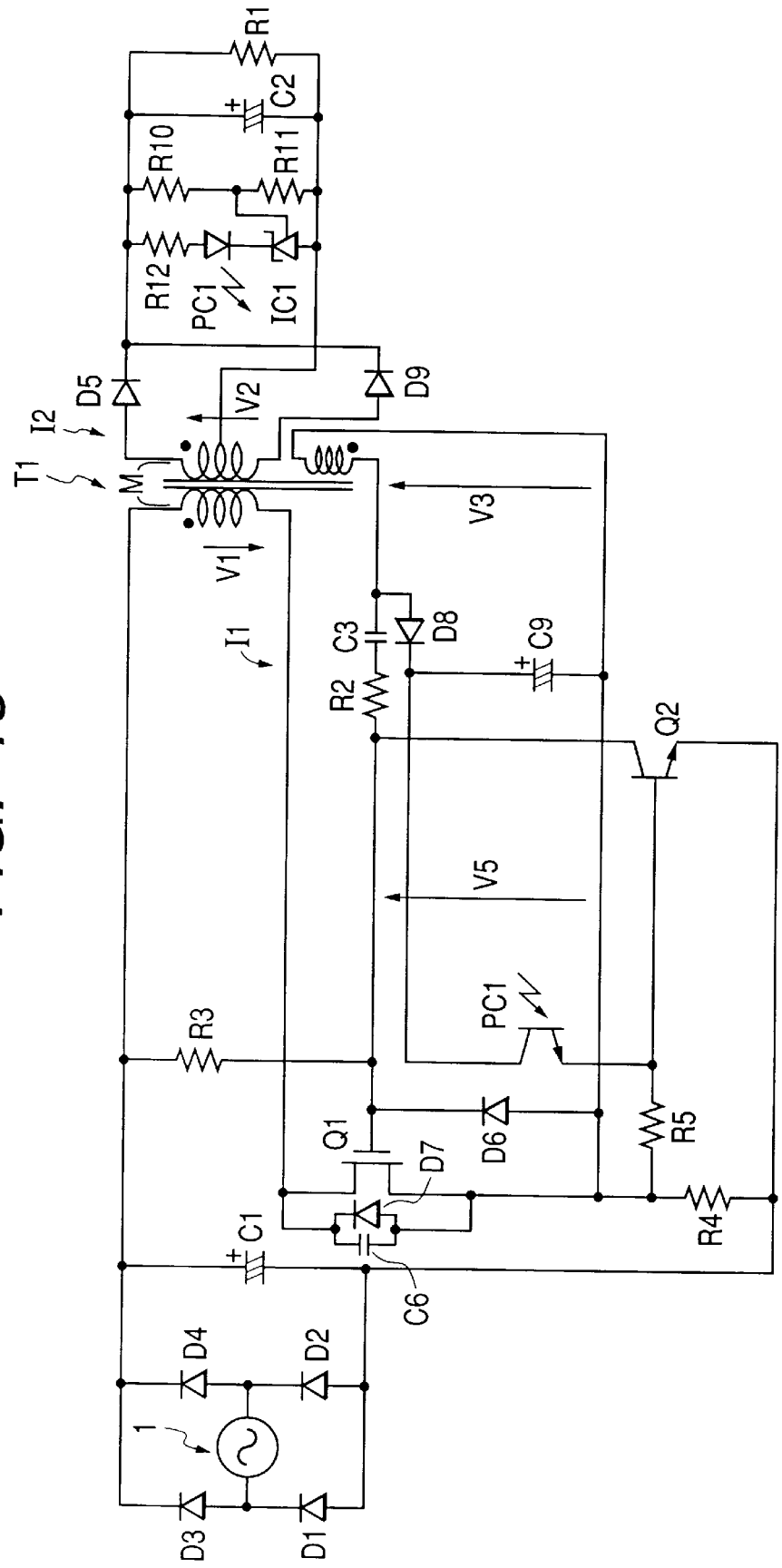
FIG. 13 is a circuit diagram showing the third modification of the power supply device according to the third embodiment of the present invention shown in FIG. 9.
Figure 14:
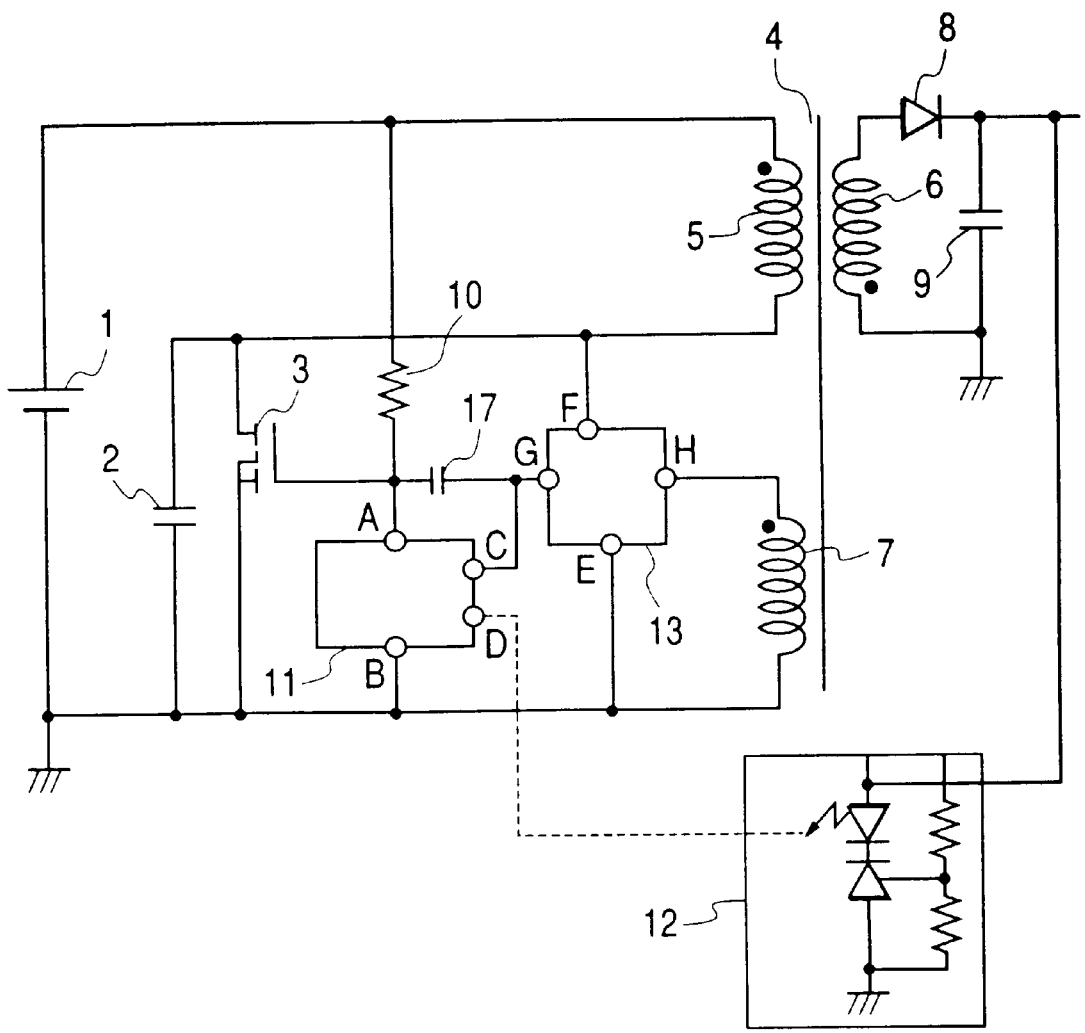
FIG. 14 is a circuit diagram of a conventional power supply device.

FIG. 13 shows the third modification of the power supply device shown in FIG. 9 according to the third embodiment of the present invention.

The power supply device shown in FIG. 13 comprises a commercial power supply 1, a leakage transformer T1, a switching element Q1 comprising, e.g., a FET, a transistor Q2, diodes D1, D2, D3, D4, D5, D6, D7, D8, and D9, a shunt regulator IC1, a photocoupler PC1, electrolytic capacitors C1, C2, and C9, capacitors C3 and C6, and resistors R1, R2, R3, R4, R10, R11, and R12.

Since the difference from the second modification lies in the arrangement for controlling the output voltage and that for overcurrent protection (that is, the third modification employs an arrangement using a single common transistor Q2 in place of the arrangement for using the transistor Q3 for controlling the ON-OFF timing of the switching means and the arrangement using the transistor Q2 for overcurrent protection in the second modification), only the operation based on such arrangement will be explained below.

The method of controlling the output voltage Vo across the two terminals of the load R1 to be constant will be explained below. The DC output voltage Vo is voltage-divided by the resistors R10 and R11, and is detected by the shunt regulator IC1. When the output voltage Vo is high, the light-emitting element of the photocoupler PC1 emits a larger amount of light, and its light-receiving element receives a larger amount of light, thus increasing the electrical current that flows in the photocoupler PC1. Consequently, the potential difference across the two terminals of the resistor R5 becomes larger, and the voltage produced across the two terminals of the resistors R4 and R5 exceeds Vbe of the transistor Q2 earlier, so as to turn on the transistor Q2 earlier, turn off the switching element Q1 earlier, and reduce energy to be saved in the transformer T1, thus lowering the output voltage Vo.

When the output voltage Vo is low, the light-emitting element of the photocoupler PC1 emits a smaller amount of light, and its light-receiving element receives a smaller amount of light, thus decreasing the electrical current that flows in the photocoupler PC1. As a result, the potential difference across the two terminals of the resistor R5 becomes smaller, and the voltage produced across the two terminals of the resistors R4 and R5 exceeds Vbe of the transistor Q2 later, so as to turn on the transistor Q2 later, turn off the switching element Q1 later, and increase energy to be saved in the transformer T1, thus making the output voltage Vo higher. Therefore, the detection voltage of the shunt regulator IC1 becomes constant, i.e., the output voltage Vo becomes constant.

Overcurrent protection will be explained below. As the load R1 becomes smaller, the electrical current on the primary side of the transformer T1 increases, the output voltage Vo is going to lower, the light-emitting element of the photocoupler PC1 ceases to emit light, and its light-receiving element ceases to receive light, thus stopping flow of the electrical current. Hence, no electrical current is supplied to the resistor R5 to form zero potential difference across the two terminals of the resistor R5, and the voltage produced across the two terminals of the resistor R4 exceeds Vbe of the transistor Q2 to turn on the transistor Q2, and turn off the switching element Q1. At this time, the energy to be saved in the transformer T1 is maximized to provide overcurrent protection. As the resistor R1 decreases, the output voltage Vo lowers. More specifically, the output voltage can be controlled to a predetermined voltage without requiring the transistor and capacitor that form a portion of the self-excited oscillation circuit of the second modification. Also, overcurrent protection can be achieved at the same time.

As described in detail above, according to the present invention, a power supply device in which a switching means for controlling power supply to the input winding of a transformer is connected to a resonance capacitor connected to the input winding of the transformer so as to obtain a predetermined DC voltage at an output capacitor connected to the output winding of the transformer in accordance with the switching operation of the switching means, comprises a leakage transformer as the transformer, and a control means for controlling the switching operation of the switching means. The control means is controlled by the output voltage from the second output winding of the transformer, and has a means for producing resonance between the resonance capacitor and a leakage inductance between the input winding and first output winding of the leakage transformer upon switching operation of the switching means. The control means delays the rise timing of the terminal voltage of the switching means using that means to reduce losses upon switching operation of the switching means, thus improving efficiency and realizing a low-noise power supply.

Also, a voltage resonance power supply, which requires neither a detection circuit that detects zero drain voltage nor a gate-direction electrical current switching circuit that controls the gate, and switches at zero voltage (switches from OFF to ON in the non-resonance state), can be realized. No extra inductors are used, and the transformer can have a loosely coupled structure, i.e., an inexpensive, split-winding transformer with a simple structure, can be used. Furthermore, driving of the gate can be controlled more stably without requiring a capacitor, and the output voltage can be controlled to a predetermined voltage without requiring a transistor and capacitor that form a portion of a self-excited oscillation circuit.

What is claimed is:

1. A power supply device comprising:

a transformer having an input winding and first and second output windings, and having a leakage component;

switching means for controlling power supply to said input winding of said transformer;

a resonance capacitor connected to said input winding of said transformer;

an output capacitor connected to said first output winding of said transformer, a predetermined voltage being obtained at said output capacitor in accordance with a switching operation of said switching means;

control means for controlling the switching operation of said switching means, said control means being controlled by an output voltage from said second output winding of said transformer; and means for producing a resonance state between said resonance capacitor and an inductance as the leakage component of said transformer upon switching operation of said switching means, said producing means delaying a rise timing of an applied voltage waveform of said switching means to reduce losses upon switching operation of said switching means.

2. A power supply device comprising:

a transformer having an input winding and first and second output windings, and having a leakage component;

switching means for controlling power supply to said input winding of said transformer;

drive means for driving said switching means;

a resonance capacitor connected to said input winding of said transformer;

an output capacitor connected to said first output winding of said transformer, a predetermined voltage being obtained at said output capacitor in accordance with a switching operation of said switching means;

control means for controlling the switching operation of said switching means, said control means being controlled by an output voltage from said second output winding of said transformer; and means for producing a resonance state between said resonance capacitor and an inductance as the leakage component between said input winding and said first output winding of said transformer upon switching operation of said switching means, said producing means delaying a rise timing of an applied voltage waveform of said switching means to reduce losses upon switching operation of said switching means.

3. A device according to claim 2, wherein said control means disables said switching means by driving a transistor via a CR charging/discharging circuit using a voltage from said second output winding of said transformer, and comprises phase delay means for driving said switching means via said drive means using the voltage from said second output winding of said transformer, and delaying a phase of the switching operation of said switching means.

4. A device according to claim 2, wherein said control means disables said switching means by driving a transistor via a CR charging/discharging circuit using a voltage from said second output winding of said transformer, drives said switching means via said drive means using the voltage from said second output winding of said transformer, and couples said second output winding of said transformer between said input winding and said first output winding.

5. A device according to claim 2, further comprising:

voltage generation means for generating a voltage in accordance with the output voltage from said first output winding of said transformer; and voltage detection means for detecting the output voltage from said first output winding of said transformer, and generating a signal in accordance with the detected output voltage, wherein said voltage detection means sets a switching operation level of said control means in accordance with the signal generated by said voltage detection means.

6. A device according to claim 5, wherein said control means comprises current detection means for detecting a current of said switching means, and disabling said switching means when said means detects that the detected current has reached a predetermined current value, means for controlling using a combination of said current detection means and control by detecting the voltage, and phase delay means for driving said switching means via said drive means using a voltage from said second output winding of said transformer, and delaying a phase of the switching operation of said switching means.

7. A device according to claim 5, wherein said control means comprises current detection means for detecting a current of said switching means, and disabling said switching means when said means detects that the detected current has reached a predetermined current value, and means for controlling using a combination of said current detection means and control by detecting the voltage, and said control means drives said switching means via said drive means using a voltage from said second output winding of said transformer, and couples said second output winding of said transformer between said input winding and first output winding.

8. A device according to claim 2, wherein the switching operation of said switching means is ON-OFF operation, and when said switching means is OFF, said means for producing the resonance state operates, and the predetermined voltage is obtained at said output capacitor.

9. A device according to claim 2, wherein the switching operation of said switching means is ON-OFF operation, and when said switching means is ON, the predetermined voltage is obtained at said output capacitor.

10. A device according to claim 2, wherein the switching operation of said switching means is ON-OFF operation, and the predetermined voltage is obtained at said output capacitor independently of an ON or OFF state of said switching means.

11. A power supply device comprising:
a transformer having an input winding and first and second output windings, and having a leakage component;
DC power supply means, connected to said input winding, for supplying a DC power supply voltage;
a load connected to said first output winding;
switching means, connected to said first output winding, for controlling a current which flows in said first output winding on the basis of said DC power supply means;
resonance circuit means for producing a resonance state by a resonance capacitor arranged in association with said switching means, and an inductance as said leakage component obtained by a winding including at least said first output winding of said transformer; and
switching means control means for ON-OFF-switching said switching means in accordance with electric power supplied from said second output winding,
wherein said power supply device is built as a self-excited oscillation circuit for ON-OFF-controlling said switching means by said switching means control means, wherein when said switching means is OFF, said resonance circuit means produces the resonance state during a given period of an OFF duration of said switching means, wherein said switching means is switched from OFF to ON in a non-resonance state produced after the resonance state, and wherein when said switching means is OFF, electric power is mainly supplied to said load connected to said first output winding.

12. A device according to claim 11, wherein said switching means control means decreases a voltage generated by said second output winding to a voltage which turns off said switching means, thereby turning off said switching means and producing the resonance state by said resonance circuit means, and raises the voltage generated by said second output winding to a voltage which turns on said switching means in a non-resonance state after the resonance state produced by said resonance circuit means, thereby turning on said switching means.

13. A device according to claim 12, wherein said switching means control means comprises phase delay means for delaying the voltage of said second output winding, which drops first due to the resonance state and then rises, and supplying a voltage which turns on said switching means to said switching means in the non-resonance state after the resonance state produced by said resonance circuit means.

14. A device according to claim 12, wherein said switching means control means couples said second output winding to said input winding and first output winding so as to prevent a voltage of said second output winding, which supplies a voltage that turns on said switching means, from generating in the non-resonance state after the resonance state produced by said resonance circuit means.

15. A device according to claim 11, further comprising voltage control means for controlling a voltage generated by said first output winding to be constant, and wherein said voltage control means generates a signal corresponding to the voltage generated by said first output winding, supplies the signal to said switching means control means, and makes said switching means control means control an ON-OFF switching time of said switching means, thereby controlling the voltage generated by said first output winding to be constant.

16. A device according to claim 11, further comprising overcurrent protection means, and wherein said overcurrent protection means turns off said switching means when said load becomes small and a large amount of current is supplied to said load.

17. A power supply device comprising:
DC power supplying means for obtaining a DC power supply voltage by rectifying and smoothing a commercial power supply voltage;
a transformer having an input winding and more than one output windings;
switching means for controlling power supply from said DC power supply means to said input winding;
drive means for driving said switching means;
a resonance capacitor connected to said input winding;
voltage generation means for generating a predetermined voltage on the basis of an output voltage from a first output winding of said transformer;
voltage detection means for detecting the output voltage of said first output winding and generating a signal according to the detected output voltage; and
switching means control means for controlling said switching means via said drive means in accordance with the signal generated by said voltage detection means,
wherein said power supply device is built as a self-excited oscillation circuit for ON-OFF-controlling said switching means by said switching means control means, when said switching means is OFF, a resonance state is produced between said resonance capacitor and a leakage inductance between said input winding and first output winding during a given period in an OFF duration of said switching means, said switching means is switched from OFF to ON in a non-resonance state produced after the resonance state, and when said switching means is ON, electric power is mainly supplied to a load connected to said first output winding.

18. A power supply device comprising:
DC power supplying means for obtaining a DC power supply voltage by rectifying and smoothing a commercial power supply voltage;

a transformer having an input winding and more than one output windings;

switching means for controlling power supply from said DC power supply means to said input winding;

drive means for driving said switching means;

a resonance capacitor connected to said input winding;

voltage generation means for generating a predetermined voltage on the basis of an output voltage from a first output winding of said transformer;

voltage detection means for detecting the output voltage of said first output winding and generating a signal according to the detected output voltage; and switching means control means for controlling said switching means via said drive means in accordance with the signal generated by said voltage detection means, wherein said power supply device is built as a self-excited oscillation circuit for ON-OFF-controlling said switching means by said switching means control means, when said switching means is OFF, a resonance state is produced between said resonance capacitor and a leakage inductance between said input winding and first output winding during a given period in an OFF duration of said switching means, said switching means is switched from OFF to ON in a non-resonance state produced after the resonance state, and electric power is supplied to a load connected to said first output winding independently of a direction of current that flows in said first output winding by ON-OFF-controlling said switching means.

19. A power supply device comprising:

a transformer having an input winding and first and second output windings;

DC power supply means, connected to said input winding, for supplying a DC power supply voltage;

a load connected to said first output winding;

switching means, connected to said first output winding, for controlling a current which flows in said first output winding on the basis of said DC power supply means;

resonance circuit means for producing a resonance state by a resonance capacitor arranged in association with said switching means, and an inductance obtained by a winding including at least said first output winding of said transformer; and switching means control means for ON-OFF-controlling said switching means in accordance with electric power supplied from said second output winding, wherein said power supply device is built as a self-excited oscillation circuit for ON-OFF-controlling said switching means by said switching means control means, when said switching means is OFF, said resonance circuit means produces the resonance state during a given period of an OFF duration of said switching means, said switching means is switched from OFF to ON in a non-resonance state produced after the resonance state, and electric power is supplied to said load connected to said first output winding independently of a direction of current that flows in said first output winding by ON-OFF-controlling said switching means.

* * * * *

UNITED STATES PATENT AND TRADEMARK OFFICE
CERTIFICATE OF CORRECTION

PATENT NO.    : 5,978,234
DATED         : November 2, 1999
INVENTOR(S)   : JOJI NAGAHIRA It is certified that error appears in the above-identified patent and that said Letters Patent is hereby corrected as shown below:

COLUMN 1

Line 31, "electrical current 12" should read --electrical current I2--.

COLUMN 13

Line 53, "Voacross" should read --Vo across--.

COLUMN 16

Line 33, "R," should read --R1,--.

Signed and Sealed this

Seventeenth Day of April, 2001

Attest:

NICHOLAS P. GODICI

Attesting Officer     Acting Director of the United States Patent and Trademark Office